(12) United States Patent
Warner et al.

(10) Patent No.: US 10,928,534 B2
(45) Date of Patent: Feb. 23, 2021

(54) METHOD OF, AND APPARATUS FOR, FULL WAVEFORM INVERSION

(71) Applicant: IMPERIAL INNOVATIONS LIMITED, London (GB)

(72) Inventors: Mike Warner, Kingston (GB); Lluis Guasch Batalla, London (GB)

(73) Assignee: Imperial Innovations Limited, London (GB)

( * ) Notice: Subject to any disclaimer, the term of this patent is extended or adjusted under 35 U.S.C. 154(b) by 761 days.

(21) Appl. No.: 15/033,045

(22) PCT Filed: Jan. 14, 2014

(86) PCT No.: PCT/GB2014/050100
§ 371 (c)(1),
(2) Date: Apr. 28, 2016

(87) PCT Pub. No.: WO2015/063444
PCT Pub. Date: May 7, 2015

(65) Prior Publication Data
US 2016/0238729 A1  Aug. 18, 2016

(30) Foreign Application Priority Data

Oct. 29, 2013 (GB) .................... 1319095.4

(51) Int. Cl.
*G01V 1/36* (2006.01)
*G01V 1/28* (2006.01)

(52) U.S. Cl.
CPC .............. *G01V 1/364* (2013.01); *G01V 1/282* (2013.01); *G01V 2210/27* (2013.01); *G01V 2210/614* (2013.01)

(58) Field of Classification Search
CPC .................. G01V 1/364; G01V 1/282
See application file for complete search history.

(56) References Cited

U.S. PATENT DOCUMENTS

2012/0155217 A1* 6/2012 Dellinger ............... G01V 1/005
367/38
2012/0215501 A1 8/2012 Vinje et al.
(Continued)

FOREIGN PATENT DOCUMENTS

GB 2481270 A 12/2011
WO 2011123197 A1 10/2011
(Continued)

OTHER PUBLICATIONS

UKIPO Search Report dated Feb. 11, 2014, for application No. GB1319095.4.
(Continued)

*Primary Examiner* — Christine A Enad
(74) *Attorney, Agent, or Firm* — Conley Rose, P.C.

(57) ABSTRACT

A method of subsurface exploration includes generating a representation of a portional volume of the Earth from a seismic measurement of a physical parameter. The method includes providing observed seismic dataset having three distinct nonzero data values derived from three distinct nonzero seismic measured values of said portional volume of the Earth, generating a predicted seismic dataset having three distinct nonzero data values, generating a nontrivial convolutional filter including three nonzero filter coefficients, generating a convolved observed dataset by convolving the convolutional filter with said observed seismic dataset, generating primary objective functions to measure the similarity between said convolved observed dataset and said predicted dataset, maximizing and/or minimizing said primary objective functions by modifying at least one filter coefficient of the convolutional filter, generating predetermined reference filters having at least three reference coefficients generating secondary objective functions to measure the similarity between filter coefficients for the nontrivial filter and reference coefficients for the predetermined refer- (Continued)

ence filters, and minimizing and/or maximizing said secondary objective functions by modifying a model coefficient of a subsurface model of a portion of the Earth to produce an updated subsurface model of a portion of the Earth.

32 Claims, 10 Drawing Sheets

(56) References Cited

U.S. PATENT DOCUMENTS

| | | | | |
|---|---|---|---|---|
| 2013/0028052 A1* | 1/2013 | Routh | .................. | G01V 1/28 367/43 |
| 2013/0238249 A1* | 9/2013 | Xu | .................. | G01V 1/303 702/18 |
| 2013/0336551 A1* | 12/2013 | Clingman | ............. | A61B 5/0095 382/128 |
| 2014/0078860 A1* | 3/2014 | Poole | .................. | G01V 1/364 367/7 |
| 2015/0006085 A1* | 1/2015 | Bisley | .................. | G01V 1/36 702/14 |
| 2015/0120200 A1* | 4/2015 | Brenders | .................. | G01V 1/28 702/18 |
| 2015/0236668 A1* | 8/2015 | Poole | .................. | G01V 1/364 703/2 |
| 2015/0346365 A1* | 12/2015 | Desrues | ............... | G01V 1/3808 367/20 |
| 2015/0346367 A1* | 12/2015 | Lambare | ................ | G01V 1/303 367/73 |
| 2016/0178772 A1* | 6/2016 | Carter | .................. | G01V 1/306 702/17 |

FOREIGN PATENT DOCUMENTS

| | | |
|---|---|---|
| WO | 2012170091 A1 | 12/2012 |
| WO | 2013093467 A1 | 6/2013 |

OTHER PUBLICATIONS

Simon Luo and Paul Sava: "A deconvolution-based objective function for wave-equation inversion," SEG San Antonio 2011 Annual Meeting, Jan. 1, 2011.

Michael Warner et al.: "Full-waveform inversion of cycle-skipped seismic data by frequency down-shifting," SEG Houston 2013 Annual Meeting, Jan. 1, 2013.

International Search Report and Written Opinion dated Jul. 25, 2014, for International Application No. PCT/GB2014/050100.

* cited by examiner

METHOD OF, AND APPARATUS FOR, FULL WAVEFORM INVERSION

CROSS-REFERENCE TO RELATED APPLICATIONS

This application is a 35 U.S.C. § 371 national stage application of PCT/GB2014/050100 filed Jan. 14, 2014, entitled "Method of, and Apparatus for, Full Waveform Inversion," which claims priority to British application No. GB 1319095.4 filed Oct. 29, 2013, both of which are incorporated herein by reference in their entirety for all purposes

BACKGROUND

Field of the Disclosure

The present disclosure relates to a method of, and apparatus for, full waveform inversion. More particularly, the present disclosure relates to an improved method of, and apparatus for, full waveform inversion in which cycle skipped misconvergence is mitigated or eliminated.

Description of Related Art

There is significant interest in surveying sections of the Earth to detect natural mineral resources or other sites of geological interest. One approach to detection of such natural features is seismic surveying. Seismic surveys are the principal means by which the petroleum industry can explore the subsurface of the Earth for oil and gas reserves. Typically, seismic survey data is acquired and analyzed with regard to identifying locations suitable for direct investigation of the sub-surface by drilling. Seismic surveying also has applications within the mining industry and within other industrial sectors that have an interest in details of the subsurface of the Earth.

In a seismic survey, one or more natural or artificial seismic sources are arranged to generate vibrational energy which is directed into the subsurface of the Earth. Reflected, refracted and other signals returned from subsurface features are then detected and analyzed. These signals can be used to map the subsurface of the Earth.

A schematic illustration of an experimental set up 10 for an undersea seismic survey is shown in FIG. 1. However, this example is intended to be non-limiting and an equivalent experiment can be carried out on land. The present disclosure is applicable to subsurface exploration in any suitable environment, for example land or marine measurements of a portion of the subsurface of the Earth. The present disclosure may be applicable to identification of numerous subsurface resources, and is intended to include oil exploration and gas prospecting.

The skilled person would be readily aware of the suitable environments in which data could be gathered for analysis and exploration purposes as set out in the present disclosure.

In this example, the experimental set up 10 comprises a source 12. In this example, the source 12 is located on a ship 14, although this need not be the case and the source may be located on land, or within the sub-surface, or on any other suitable vessel or vehicle.

The source 12 generates acoustic and/or elastic waves having sufficient vibrational energy to penetrate the subsurface of the Earth and generate sufficient return signals to aid useful detection. The source 12 may comprise, for example, an explosive device, or alternatively an air gun or other mechanical device capable of creating sufficient vibrational disturbance. Commonly, for many seismic survey experiments a single source is used which is shot from multiple locations. Naturally occurring sources may also be employed.

A plurality of detectors 16 is provided. The detectors 16 may comprise any suitable vibrational detection apparatus. Commonly, two types of device are used. Geophones which detect particle motion, and hydrophones which detect pressure variations. Commonly, a large number of detectors 16 are laid out in lines for 2D data acquisition. Alternatively, the detectors 16 can be arranged in sets of lines or in a grid for 3D data acquisition. Detectors 16 may also be located within the subsurface, for example down boreholes. The detectors 16 are connected to trace acquisition apparatus such as a computer or other electronic storage device. In this example, the acquisition apparatus is located on a further ship 18. However, this need not be the case and other arrangements are possible.

In use, elastic waves 20 generated by the source 12 propagate into the subsurface 22 of the Earth. The subsurface 22, in general, comprises one or more layers or strata 24, 26, 28 formed from rock or other materials. The elastic waves 20 are transmitted and refracted through the layers and/or reflected off the interfaces between them and/or scattered from other heterogeneities in the sub-surface and a plurality of return signals 30 is detected by the detectors 16.

In general, the returning signals 30 comprise elastic waves having different polarizations. Primary or pressure waves (known as P-waves) are approximately longitudinally polarized and comprise alternating rarefactions and compressions in the medium in which the wave is travelling. In other words, in an isotropic environment, the oscillations of a P-wave are parallel to the direction of propagation. P-waves typically have the highest velocity and so are typically the first to be recorded. P-waves travel at a velocity $V_p$ in a particular medium. $V_p$ may vary with position, with direction of travel, with frequency, and with other parameters, and is, effectively, the speed of sound in a medium. It is this quantity $V_p$ which is most commonly of particular interest in seismic inversion.

Shear or secondary waves (known as S-waves) may also be generated. S-waves have an approximately transverse polarization. In other words, in an isotropic environment, the polarization is perpendicular to the direction of propagation. S-waves are in general, more slowly moving than P-waves in materials such as rock. Whilst S-wave analysis is possible and falls within the scope of the present disclosure, the following description will focus on the analysis of P-waves.

A seismic survey is typically composed of a large number of individual source excitation events. The Earth's response to these events is recorded at each receiver location, as a seismic trace for each source-receiver pair. For a two dimensional survey, the tens of thousands of individual traces may be taken. For the three dimensional case, this number may run into the millions.

A seismic trace comprises a sequence of measurements in time made by one or more of the multiplicity of detectors 16, of the returning reflected, refracted and/or scattered acoustic and/or elastic waves 30 originating from the source 12. In general, a partial reflection of the acoustic wave 20 occurs at a boundary or interface between two dissimilar materials, or when the elastic properties of a material changes. Traces are usually sampled in time at discrete intervals of the order of milliseconds.

Seismic surveys at the surface or seabed can be used to extract rock properties and construct reflectivity images of the subsurface. Such surveys can, with the correct interpretation, provide an accurate picture of the subsurface structure of the portion of the Earth being surveyed. This may include subsurface features associated with mineral resources such as hydrocarbons (for example, oil and natural gas). Features of interest in prospecting include: faults, folds, anticlines, unconformities, salt domes, reefs.

Key to this process of modelling and imaging a portion of earth is the seismic velocity $V_p$. In a portion of the volume of the Earth, $V_p$ may be estimated in various ways.

Full-wavefield inversion (FWI) is a known method for analyzing seismic data. FWI is able to produce models of physical properties such as $V_p$ in a subsurface region that have high fidelity and that are well resolved spatially. FWI seeks to extract the properties of subsurface rocks from a given seismic dataset recorded at the surface or seabed. A detailed velocity estimate can be produced using an accurate model with variations on the scale of a seismic wavelength.

The FWI technique involves generating a two or three dimensional model to represent the measured portion of the Earth and attempting to modify the properties and parameters of the Earth model to generate predicted data that matches the experimentally obtained seismic trace data.

The predicted data is calculated from the subsurface model typically using the full two-way wave equation. The final model has potentially far higher resolution and accuracy however the method can fail due to the sensitivity of the predicted waveforms to the model. FWI is an iterative process requiring a starting model. A sufficiently accurate starting model for FWI may be provided by travel-time tomography.

FWI can extract many physical properties ($V_p$ and $V_s$ velocities, attenuation, density, anisotropy) of the modelled portion of the Earth. However, $V_p$, the P-wave velocity, is a particularly important parameter which the subsequent construction of the other parameters depends heavily upon. Nevertheless, other parameters may be used with the present disclosure, either alone or in combination. The nature and number of parameters used in a model of a portion of the Earth will be readily apparent to the skilled person.

The FWI technique seeks to obtain an accurate and high resolution $V_p$ model of the subsurface which generates predicted data that matches the recorded data. Predicted data is calculated using the full two-way wave equation. This is known as forward problem. This equation can be in the time domain, the frequency domain, or other suitable domains, and it may be elastic or acoustic, isotropic or anisotropic, and may include other physical effects such as attenuation and dispersion. In most cases FWI proceeds using the acoustic approximation with a single component modelled wavefield which in the marine case is pressure.

An example of a basic starting model is shown in FIG. 2. The model shows a simple estimation of the subsurface of a portion of the Earth. The source of acoustic waves is shown as a star and a plurality of receivers shown as circles. Both the source and the receivers are located at or above the seabed. As shown, the basic model shows a gradually increasing $V_p$ with increasing depth without any of the detailed structure present in a Marmousi true earth model (which is shown in FIG. 6a) and described later).

A modelled seismic gather is shown in FIG. 3 for one shot and one line of receivers. The modelled seismic traces in the gather have been generated using the basic model shown in FIG. 2. This is done by applying the isotropic acoustic wave equation to the model of FIG. 2 and then modelling the reflected and refracted signals as they would be detected. The modelled seismic shot gather is made up of individual traces at surface receiver positions showing pressure recorded as a function of time.

In general, the parameters of the model are estimated at a plurality of points set out in a grid or volume, but they may be estimated from any suitable parameterization. The model is used to generate a modelled representation of the seismic data set. The predicted seismic data set is then compared to the real-world experimentally obtained seismic data set. Then, through use of a convergent numerical iteration, the parameters of the model are modified until the predicted seismic data set generated from the Earth model matches the actual observed seismic data to a sufficient degree of accuracy or until sufficient convergence is obtained. Examples of this technique are illustrated in "*An overview of full-waveform inversion in exploration geophysics*", J. Virieux and S. Operto, Geophysics Vol. 74 No. 6 and U.S. Pat. No. 7,725,266.

A general method to update a model will now be described. FWI typically operates on the principle of iteratively updating the starting model to minimize or maximize an objective function through repeated steepest-descent direction calculation, or an analogous technique. An objective function represents some measure of the mismatch or some measure of similarity between the recorded data and the predicted data. A measure of mismatch, obtained for example by subtracting two traces, should be minimized; whereas a measure of similarity, obtained for example by cross-correlating two traces, should be maximized.

Due to the non-linearity in the relationship between the model and the data, the objective function used in FWI will oscillate with changes in the model. This makes it necessary to have a sufficiently accurate starting model for global minimum convergence. The objective function can be formulated in the frequency domain, the time domain or other suitable domain. The choice of domain allows the use of pre-conditioning on either the data or the model update direction that could improve convergence or the linearity of the inverse problem.

Frequency domain inversion is equivalent to time domain inversion if all the frequencies are inverted simultaneously. However, the global minimum broadens at lower frequencies reducing how accurate the starting model needs to be for localized inversion to be successful.

Commonly, localized gradient-based methods are used with FWI. These methods iteratively update an existing model in a direction that derives from the objective function's direction of steepest descent. The central purpose of FWI is to find a model of the subsurface that minimizes the difference between an observed seismic dataset and a predicted seismic dataset generated by the model for the same real-world spatial data points as the observed seismic dataset.

There are numerous ways to quantify the difference (also known as the residual) between the datasets. However, amongst the most common is a least-squares formulation where the sum of the squares of the differences between the two datasets is minimized over all sources and receivers and over all times. In other words, a model is sought that minimizes the $L_2$-norm of the data residuals.

The $L_2$-norm expresses the misfit between the two datasets as a single number. This parameter is known as the objective function, although it often takes other names such as the misfit function, the cost function or the functional. The objective function $f$ is a real, positive, scalar quantity, and it is a function of the model m.

In practice, a factor of a half is often included in the definition of the objective function $f$ because it makes later results simpler. An example of a known objective function $f(m)$ is shown in equation 1):

$$f(m) = \frac{1}{2}\|\delta d\|^2 = \frac{1}{2}\delta d^\dagger \delta d = \frac{1}{2}\sum^{n_s}\sum^{n_r}\sum^{n_t} |d_{pred} - d_{obs}|^2 \qquad 1)$$

where $n_s$, $n_r$ and $n_t$ are the number of sources, receivers and time samples in the data set.

In the time-domain the data and the data residuals will be real quantities. However, in the frequency domain the data will in general be complex, as will the source and sometimes the model properties. Equation 1) is correctly recited for complex data. However, in the frequency domain, $n_t$ would be expressed as $n_f$, i.e. a summation over frequency rather than time.

FWI is a local iterative inversion scheme. A starting model $m_0$ that is assumed to be sufficiently close to the true, ideal model is prepared. The process then makes a series of step-wise improvements to this model which successively reduces the objective function towards zero. Therefore, across an iterative step of the calculation, the objective function needs to be considered for a starting model $m_0$ and a new model $m=m_0+\delta m$.

For a scalar function of a single scalar variable, the Taylor series can be used, truncated to second order. This generates equation 2):

$$f(m) = f(m_0 + \delta m) = \qquad 2)$$
$$f(m_0) + \delta m^T \frac{\partial f}{\partial m}\bigg|_{m=m_0} + \frac{1}{2}\delta m^T \frac{\partial^2 f}{\partial m^2}\bigg|_{m=m_0} \delta m + O(\delta m^3)$$

Differentiating this express with respect to m, and setting the result to zero to minimize $f$ with respect to $m=m_0+\delta m$, equation 2) becomes:

$$\frac{\partial f}{\partial m}\bigg|_{m=m_0+\delta m} = 0 + \frac{\partial f}{\partial m}\bigg|_{m=m_0} + \frac{\partial^2 f}{\partial m^2}\bigg|_{m=m_0} \delta m + O(\delta m^2) = 0 \qquad 3)$$

Then, neglecting second order terms, equation 4) can be derived which expresses the updated to the model $\delta m$:

$$\delta m \approx -\left(\frac{\partial^2 f}{\partial m^2}\right)^{-1} \frac{\partial f}{\partial m} \equiv -H^{-1}\nabla_m f \qquad 4)$$

Where $\nabla_{m,f}$ is the gradient of the objective function $f$ with respect to the model parameters, and H is the Hessian matrix of second differentials, both evaluated at $m_0$.

If the model has M parameters, then the gradient is a column vector of length M and the Hessian is an M×M symmetric matrix.

If the number of model parameters M is large, then calculating the Hessian is computationally demanding, and inverting the Hessian exactly is normally computationally intractable. Consequently the method that is typically used is to replace the inverse of the Hessian in equation (9) by a simple scalar a (referred to as the step length). Equation 4) can then be expressed as:

$$\delta m = -\alpha \frac{\partial f}{\partial m} = -\alpha \nabla_m f \qquad 5)$$

Based on equation 5), conventional FWI can use the method of steepest descent. This involves essentially 5 steps:
1. Start from model $m_0$;
2. Evaluate the gradient of the objective function for the current model;
3. Find the step length $\alpha$;
4. Subtract a times the gradient from the current model to obtain a new model; and
5. Iterate from step 2 using the new model until the objective function is minimized.

To calculate the gradient and determine the step length, a Jacobian matrix is used as set out in equation 6):

$$\nabla_m f = \frac{\partial f}{\partial m} = \frac{\partial}{\partial m}\left(\frac{1}{2}\delta d^T \delta d\right) = \left(\frac{\partial d}{\partial m}\right)^T \delta d = J^T \delta d \qquad 6)$$

where J is the Jacobian matrix.

A wave equation for a predicted dataset d generated by a source s can be written as:

$$Ap = s \qquad 7)$$

Where the dataset d is a subset of the full wavefield p extracted using the diagonal matrix D that has non-zero unit values only where there are observed data. That is, as set out in equation 8);

$$d = Dp \qquad 8)$$

Equation 7) can then be differentiated with respect to m, which is equal to zero because s and m are independent:

$$\frac{\partial A}{\partial m}p + A\frac{\partial p}{\partial m} = \frac{\partial s}{\partial m} = 0 \qquad 9)$$

Equation 9) is then pre-multiplied by the matrix D to extract the wavefield only at the points where data exists. The Jacobian can then be rewritten as:

$$J = \frac{\partial d}{\partial m} = D\frac{\partial p}{\partial m} = -DA^{-1}\frac{\partial A}{\partial m}p \qquad 10)$$

From equation 10), an expression for the gradient can be derived by recognising that $D^T \delta d = \delta d$ and substituting equation 10) into equation 6), to derive an expression for the gradient:

$$\nabla_m f = -p^T \left(\frac{\partial A}{\partial m}\right)^T (A^{-1})^T \delta d \qquad 11)$$

So to find the gradient, the forward wavefield p is calculated, the numerical operator A is differentiated with respect to the model parameters and the final term of equation 11) is calculated, which represents a back-propagated residual wavefield. These terms are then multiplied together for all times and all sources, and summed together to give a value corresponding to each parameter within the model, typically to give one value of the gradient at each grid point within the model. The final term in equation 11) can be written to arrive at equation 12):

$$A^T \delta p = \delta d \quad \quad 12)$$

Equation 12) simply describes a wavefield p that is generated by a (virtual) source $\delta d$, and that is propagated by the operator $A^T$ which is the adjoint of the operator in the original wave equation. So the term that we need to compute in equation 11) is just the solution of a modified wave equation with the data residuals used as a source.

It is then necessary to compute the step length $\alpha$. Starting from a current model $m_0$ that generates data $d_0$ and residuals $\delta d_0$, a new model $m_1 = m_0 + \delta m_1$ that generates data $d_1$ and residuals $\delta d_1$, where $\delta m$ is a small change in the opposite direction to the gradient.

Therefore, the aim is to find a new model $m_\alpha = m_0 + \alpha \delta m$ that generates residuals $\delta m_\alpha$, where $\alpha$ minimizes:

$$\frac{1}{2} \|\delta d_\alpha\|^2 \quad \quad 13)$$

Assuming a linear relationship:

$$\delta d_\alpha = \delta d_0 + \alpha(d_1 - d_0) = \delta d_0 + \alpha(\delta d_1 - \delta d_0) \quad \quad 14)$$

By rearranging and differentiating with respect to $\alpha$, setting the differential equal to zero and solving for $\alpha$, equations 15) and 16) can be derived:

$$\alpha = \frac{\delta d_0^T q}{q^T q} \quad \quad 15)$$

$$q = \delta d_0 - \delta d_1 \quad \quad 16)$$

So, to calculate the step length, a forward calculation is made with a perturbed model, and the residuals from both the original and the perturbed models combined to form equation 15).

Once $\alpha$ has been found, the original starting model $m_0$ can be replaced by $m_\alpha$ and the step of the iterative calculation is complete. This process can then be repeated.

Note that iteration is necessary because the problem to be solved is non-linear and the inverse problem has been linearized in particular stages. Implicitly, the method invokes the Born approximation. The Born approximation assumes that the perturbation to a wavefield produced by changing a model is linearly related to the change in the model. This is equivalent to considering only first-order scattering by the perturbation.

The method outlined above for performing FWI is commonly extended and modified in a variety of ways to improve both its efficiency and effectiveness.

For example, various improved approximations to the Hessian matrix H and its inverse can be made including use of Newton, Gauss-Newton, quasi-Newton and Limited Memory Broyden-Fletcher-Goldfarb-Shanno (L-BFGS) methods.

Various modifications upon simple steepest-descent are known in the art; for example conjugate gradient methods. The predicted data, observed data, data residuals, forward wavefield, backward-propagated wavefield, gradient and Hessian may all be pre-processed in various ways.

Further, additional constraints may be placed upon model updates and/or recovered model. Sources and other sub-sets of the data may be selected, modified and/or combined in various ways, and these used in the inversion in preference to using the original physical sources. Many of these enhancements are discussed and described in "*An overview of full-waveform inversion in exploration geophysics*", J. Virieux and S. Operto, Geophysics Vol. 74, WCC1-WCC26, doi: 10.1190/1.3238367.

Ideally, the above method will lead to a convergence to a model which is a correct representation of a portion of the subsurface of the Earth. However, there are some difficulties associated with obtaining correct convergence.

As set out above, FWI methodology for the objective function above relies upon a gradient decent method to solve the inverse problem. This requires that the starting model should match the observed travel times to within half a cycle. However, real seismic data are limited in their frequency bandwidth. This means that real seismic signals are oscillatory.

This is illustrated using following example as shown in FIGS. 4 and 5. FIG. 4 shows examples of observed seismic data ($d_{obs}$) and predicted seismic data ($d_{pred}$) as a function of time (on the vertical axis). FIG. 5 shows the objective function $f$ corresponding to the data of FIG. 4. As shown, the value of the objective function, or misfit, is oscillatory as a function of time.

An inaccurate starting model may predict data that are more than half a cycle in error with respect to the observed data. Such a situation is described as "cycle skipped". When this occurs, because the methodology seeks only a local minimum, FWI will tend to modify the sub-surface model such that the predicted and observed data are brought into alignment at the nearest cycle, and this will neither correspond to their correct alignment nor to the correct model. This misalignment to the nearest cycle will reduce the data misfit, and typical FWI schemes will become stranded in this position—they will have become stuck in a local minimum in the data misfit function rather than being able to find the global minimum which corresponds to the true model.

Consequently, as illustrated above, for successful convergence the predicted data must lie within half a wave cycle of the recorded data at the lowest useable frequency. In other words, the starting model must be sufficiently accurate to match the actual data to within half a wave cycle, otherwise FWI may mis-converge to a cycle-skipped local minimum.

An example of the effect of this on the generated model is shown in FIGS. 6 *a*) to 6 *f*). FIG. 6 *a*) shows the synthetic Marmousi model generated to represent the subsurface structure of a portion of the Earth. FIG. 6 *b*) shows an accurate starting model which, in general shape, follows that of the actual Marmousi model. Therefore, performing FWI starting with the starting model of FIG. 6 *b*) leads to accurate convergence as shown in FIG. 6 *c*). FIG. 6 *c*) shows the final, converged model which is a good representation of the original Marmousi model.

However, in practice, such an accurate starting model is unlikely given the lack of information about subsurface structures of real-world portions of the Earth. FIGS. 6 *d*) to 6 *f*) illustrate the operation of FWI when provided with a poor (inaccurate) starting model as shown in FIG. 6 *d*).

FIG. 6 *e*) shows the recovered model after convergence using only a single 5 Hz frequency component. FIG. 6 *f*) shows the full recovered model after subsequent higher frequency iterations. As shown, there are clear inaccuracies in the recovered model when compared to the original model of FIG. 6 *a*). Features are not resolved clearly, and are inaccurately located. This is a result of cycle skipped mis-convergence and, in practice, would give a sub-optimal final result which could lead to inaccurate identification of natural resources or other sites of interest.

The practical consequences of cycle-skipping mean that the starting model must be highly accurate, and that the observed data must contain relatively low frequencies so that the global minimum is broader. Even then, the FWI requires careful quality control such that the process does not converge towards the wrong sub-surface model.

In practice, obtaining an accurate starting model can be difficult, time-consuming, expensive or impossible to achieve. Obtaining sufficiently low frequencies in the observed data can be expensive or impossible to achieve in practice, and this requirement can invalidate the application of the technique to existing legacy datasets. As a result, cycle skipping, both in the context methods that are based upon minimizing the data residuals and those based upon maximizing the cross-correlation, can compromise and limit the broad applicability and practical uptake of FWI.

Therefore, to date, known FWI methods suffer from a technical problem that cycle skipped mis-convergence can lead to significant errors in a final, generated model of a subsurface portion of the Earth. Attempts to address this in practice often have significant limitations with regard to the size, complexity and/or cost of models and computational processing required. The present disclosure seeks to address these issues.

SUMMARY

According to a first aspect of the present disclosure, there is provided a method of subsurface exploration, the method comprising generating a geophysical representation of a portion of the volume of the Earth from a seismic measurement of at least one physical parameter, and comprising the steps of: a) providing an observed seismic data set comprising at least three distinct non-zero data values derived from at least three distinct non-zero seismic measured values of said portion of the volume of the Earth; b) generating, using a subsurface model of a portion of the Earth comprising a plurality of model coefficients, a predicted seismic data set comprising at least three distinct non-zero data values; c) generating at least one non-trivial convolutional filter, the or each filter comprising three or more non-zero filter coefficients; d) generating a convolved observed data set by convolving the or each convolutional filter with said observed seismic data set; e) generating one or more primary objective functions operable to measure the similarity and/or mismatch between said convolved observed dataset and said predicted dataset; f) maximizing and/or minimizing at least one of said primary objective functions by modifying at least one filter coefficient of the or each convolutional filter; g) generating one or more pre-determined reference filters comprising at least three reference coefficients; h) generating one or more secondary objective functions operable to measure the similarity and/or mismatch between the filter coefficients for the or each non-trivial filter and the reference coefficients for the or each pre-determined reference filters; i) minimizing and/or maximizing at least one of said secondary objective functions by modifying at least one model coefficient of said subsurface model of a portion of the Earth to produce an updated subsurface model of a portion of the Earth; and j) providing an updated subsurface model of a portion of the Earth for subsurface exploration.

By providing such an arrangement, cycle-skipping can be eliminated. Even if the data are cycle skipped, the convolutional filter is still able to cause the two datasets to match. Then a gradient inversion can, in one embodiment, be performed on the coefficients, but they are not cyclic or subject to cycle skipping in the way that the datasets are.

In one embodiment, said at least one convolutional filter is operable to transform at least a portion of said observed seismic data set to render the observed seismic data set and predicted data set approximations of one another.

In one embodiment, subsequent to step c), the method further comprises: k) generating at least one further non-trivial convolutional filter, the or each further filter comprising three or more non-zero filter coefficients; and l) generating a convolved predicted data set by convolving the or each further convolutional filter with said predicted seismic data set; and wherein step e) comprises generating one or more primary objective functions operable to measure the similarity and/or mismatch between said convolved observed dataset and said convolved predicted dataset.

In one embodiment, the or each convolutional filter is operable to transform at least a portion of said observed seismic data set and the or each further convolutional filter is operable to transform said predicted data set to render the observed seismic data set and predicted data set approximations of one another.

According to a second aspect of the present disclosure, there is provided a method of subsurface exploration, the method comprising generating a geophysical representation of a portion of the volume of the Earth from a seismic measurement of at least one physical parameter, and comprising the steps of: a) providing an observed seismic data set comprising at least three distinct non-zero data values derived from at least three distinct non-zero seismic measured values of said portion of the volume of the Earth; b) generating, using a subsurface model of a portion of the Earth comprising a plurality of model coefficients, a predicted seismic data set comprising at least three distinct non-zero data values; c) generating at least one non-trivial convolutional filter, the or each filter comprising three or more non-zero filter coefficients; d) generating a convolved predicted data set by convolving the or each convolutional filter with said predicted seismic data set; e) generating one or more primary objective functions operable to measure the similarity and/or mismatch between said observed seismic dataset and said convolved predicted dataset; f) maximizing and/or minimizing at least one of said primary objective functions by modifying at least one filter coefficient of the or each convolutional filter; g) generating one or more pre-determined reference filters comprising at least three reference coefficients; h) generating one or more secondary objective functions operable to measure the similarity and/or mismatch between the filter coefficients for the or each non-trivial filter and the reference coefficients for the or each pre-determined reference filters; i) minimizing and/or maximizing at least one of said secondary objective functions by modifying at least one model coefficient of said subsurface model of a portion of the Earth to produce an updated subsurface model of a portion of the Earth; and j) providing an updated subsurface model of a portion of the Earth for subsurface exploration.

By providing such an arrangement, cycle-skipping can be eliminated. Even if the data are cycle skipped, the convolutional filter is still able to cause the two datasets to match. Then a gradient inversion can, in one embodiment, be performed on the coefficients, but they are not cyclic or subject to cycle skipping in the way that the datasets are.

In one embodiment, said at least one convolutional filter is operable to transform at least a portion of said predicted seismic data set to render the observed seismic data set and predicted data set approximations of one another.

In one embodiment, subsequent to step c), the method further comprises: k) generating at least one further non-trivial convolutional filter, the or each further filter comprising three or more non-zero filter coefficients; and l) generating a convolved observed data set by convolving the or each further convolutional filter with said observed seismic data set; and wherein step e) comprises generating one or more primary objective functions operable to measure the similarity and/or mismatch between said convolved observed dataset and said convolved predicted dataset.

In one embodiment, the or each convolutional filter is operable to transform at least a portion of said predicted seismic data set and the or each further convolutional filter is operable to transform said observed data set to render the observed seismic data set and predicted data set approximations of one another.

In one embodiment, subsequent to step h), the method further comprises: m) normalizing the or each secondary objective function to form one or more normalized secondary objective functions operable to measure the similarity and/or mismatch between the filter coefficients for the or each non-trivial filter and the reference coefficients for the or each pre-determined reference filters, wherein the or each normalized secondary objective function is insensitive or has reduced sensitivity to the relative scaling of the filter coefficients for the or each non-trivial filter with respect to the reference coefficients for the or each pre-determined reference filter.

In one embodiment, step h) comprises generating one or more normalized secondary objective functions operable to measure the similarity and/or mismatch between the filter coefficients for the or each non-trivial filter and the reference coefficients for the or each pre-determined reference filters, wherein the or each normalized secondary objective function is insensitive or has reduced sensitivity to the relative scaling of the filter coefficients for the or each non-trivial filter with respect to the reference coefficients for the or each pre-determined reference filter.

By providing such a step of normalization, the normalized secondary objective function is rendered insensitive and/or has reduced sensitivity to the value of the reference coefficients for the or each pre-determined reference filters. In other words, consider a version of the reference coefficients for the or each pre-determined reference filters in which the reference coefficients have been multiplied by an arbitrary non-zero finite multiplicative scalar. In this situation, the normalized secondary objective function is insensitive or of limited sensitivity to the value of the scaling applied to the reference coefficients. In summary, it is the form of the reference filter that is of relevance, not the absolute magnitude or scaling.

Therefore, the absolute magnitude of the reference coefficients, whether of arbitrary value or modified by a multiplication step, is of limited significance to embodiments of the present disclosure in which normalized secondary objective function(s) are utilized.

In one embodiment, at least one of said secondary objective functions is normalized by a norm of the filter coefficients of the at least one non-trivial convolutional filter.

In one embodiment, at least one of said secondary objective functions is normalized by the L1-norm of the filter coefficients of the at least one non-trivial convolutional filter.

In one embodiment, at least one of said secondary objective functions is normalized by the L2-norm of the filter coefficients of the at least one non-trivial convolutional filter.

In one embodiment, a plurality of convolutional filters is provided. In one embodiment, a plurality of further convolutional filters is provided.

In one embodiment, a plurality of observed seismic data sets and/or a plurality of predicted seismic data sets are provided.

In one embodiment, one or more of the convolutional filters and/or further convolutional filters involve convolution in time.

In one embodiment, one or more of the convolutional filters and/or further convolutional filters involve convolution in space.

In one embodiment, one or more of the convolutional filters and/or further convolutional filters involve convolution in more than one dimension.

In one embodiment, one or more of the convolutional filters and/or further convolutional filters comprise Wiener filters.

In one embodiment, one or more of the convolutional filters and/or further convolutional filters comprise Kalman filters.

In one embodiment, one or more of the convolutional filters and/or further convolutional filters comprise least mean squares filters.

In one embodiment, one or more of the convolutional filters and/or further convolutional filters comprise normalized least mean squares filters.

In one embodiment, one or more of the convolutional filters and/or further convolutional filters comprise recursive least squares filters.

In one embodiment, one or more of the convolutional filters and/or further convolutional filters are calculated in the time domain.

In one embodiment, one or more of the convolutional filters and/or further convolutional filters are calculated in the temporal-frequency domain.

In one embodiment, one or more of the convolutional filters and/or further convolutional filters are calculated in the space domain.

In one embodiment, one or more of the convolutional filters and/or further convolutional filters are calculated in the wave-number domain.

In one embodiment, the filter coefficients are regularized and/or interpolated between said datasets subsets of said datasets.

In one embodiment, the filter coefficients are regularized and/or interpolated between filters.

In one embodiment, the secondary objective function involves the application of a weighting to the filter coefficients of said first and/or said second convolutional filter, wherein the weighting is dependent upon the temporal lag of said convolutional filter.

In one embodiment, the secondary objective function involves the application of a weighting to the filter coefficients of said first and/or said second convolutional filter, where the weighting is dependent upon the spatial lag of said convolutional filter.

In one embodiment, the secondary objective function consists of a norm of the weighted convolutional filter coefficients in combination with a norm of the unweighted filter coefficients.

In one embodiment, the secondary objective function consists of a norm of the weighted convolutional filter coefficients divided by a norm of the unweighted filter coefficients.

In one embodiment, the secondary objective function consists of a norm of the unweighted convolutional filter coefficients divided by a norm of the weighted filter coefficients.

In one embodiment, at least one of said secondary objective functions comprises a norm misfit objective function.

In one embodiment, at least one of said secondary objective functions comprises an $L_1$-norm misfit objective function.

In one embodiment, at least one of said secondary objective functions comprises a least-squares misfit objective function.

In one embodiment, step i) comprises minimizing the gradient of one or more of the secondary objective functions with respect to said model parameters.

In one embodiment, step i) is solved using adjoint-state methods. In one embodiment, step i) is solved without the use of adjoint-state methods.

In one embodiment, at least one of the pre-determined reference filters is a convolutional filter which leaves the dataset to which it is applied unaltered, or approximately unaltered, other than by multiplication by a constant.

In one embodiment, at least one of said pre-determined reference filters is a convolutional filter which leaves the dataset to which it is applied unaltered, or approximately unaltered, other than by a shift in time or space.

In one embodiment, at least one of said pre-determined reference filters is a convolutional filter which leaves the dataset to which it is applied unaltered, or approximately unaltered, other than by a rotation of phase.

In one embodiment, at least a portion of the observed seismic dataset is numerically propagated to a subsurface region of the model that is spatially removed from the location at which they were originally recorded.

In one embodiment, the method further comprises, subsequent to step i), repeating steps b) to h) for the updated subsurface model of a portion of the Earth until a convergence criterion is met.

In one embodiment, step j) further comprises: utilizing said updated model for sub-surface exploration.

In one embodiment, said at least one physical parameter comprises pressure, particle velocity or displacement.

In one embodiment, the observed data set and the predicted data set comprise values of a plurality of physical parameters.

According to a third aspect of the present disclosure, there is provided a computer program product executable by a programmed or programmable processing apparatus, comprising one or more software portions for performing the steps of the first aspect.

According to a fourth aspect of the present disclosure, there is provided a computer usable storage medium having a computer program product according to the second aspect stored thereon.

BRIEF DESCRIPTION OF THE DRAWINGS

Embodiments of the present disclosure will now be described in detail with reference to the accompanying drawings, in which.

DETAILED DESCRIPTION

The present disclosure provides an improved methodology for FWI which avoids the problem of cycle skipping. Therefore, more accurate and reliable convergence can be obtained using the present disclosure when compared to known arrangements.

Conventional FWI seeks to minimize the data misfit between the modelled and observed data sets directly or, alternatively, to maximize the similarity between the modelled and observed data sets.

The present disclosure presents an alternative method which, for the first time, reduces the likelihood of cycle skipping. The inversion problem is divided into two stages. The first stage involves the solution of a relatively straightforward inversion problem that can be solved without the detrimental effects of cycle skipped mis-convergence. The output from the first stage provides a parametric description of the main inversion problem to be solved and of the misfit function that is to be minimized.

The second stage is then to find the sub-surface model that minimizes this new parametric misfit function. If the parameterization is chosen appropriately, then cycle skipping in the major inversion step at the second stage is mitigated or eliminated.

The following embodiments illustrate the application of the present disclosure in practice. The first embodiment outlines the general approach of the present disclosure. The second and third embodiments detail a specific implementation of the present disclosure utilizing Wiener filters.

The following embodiments are described with regard to time domain analysis. However, the described methods are equally applicable to other domains, for example, frequency domain analysis. This may be achieved by performing a Fourier analysis on the time domain data and extracting particular frequencies for analysis. These aspects are to be considered to form part of the present disclosure and the skilled person would be readily aware of implementations of this.

Figure 7:
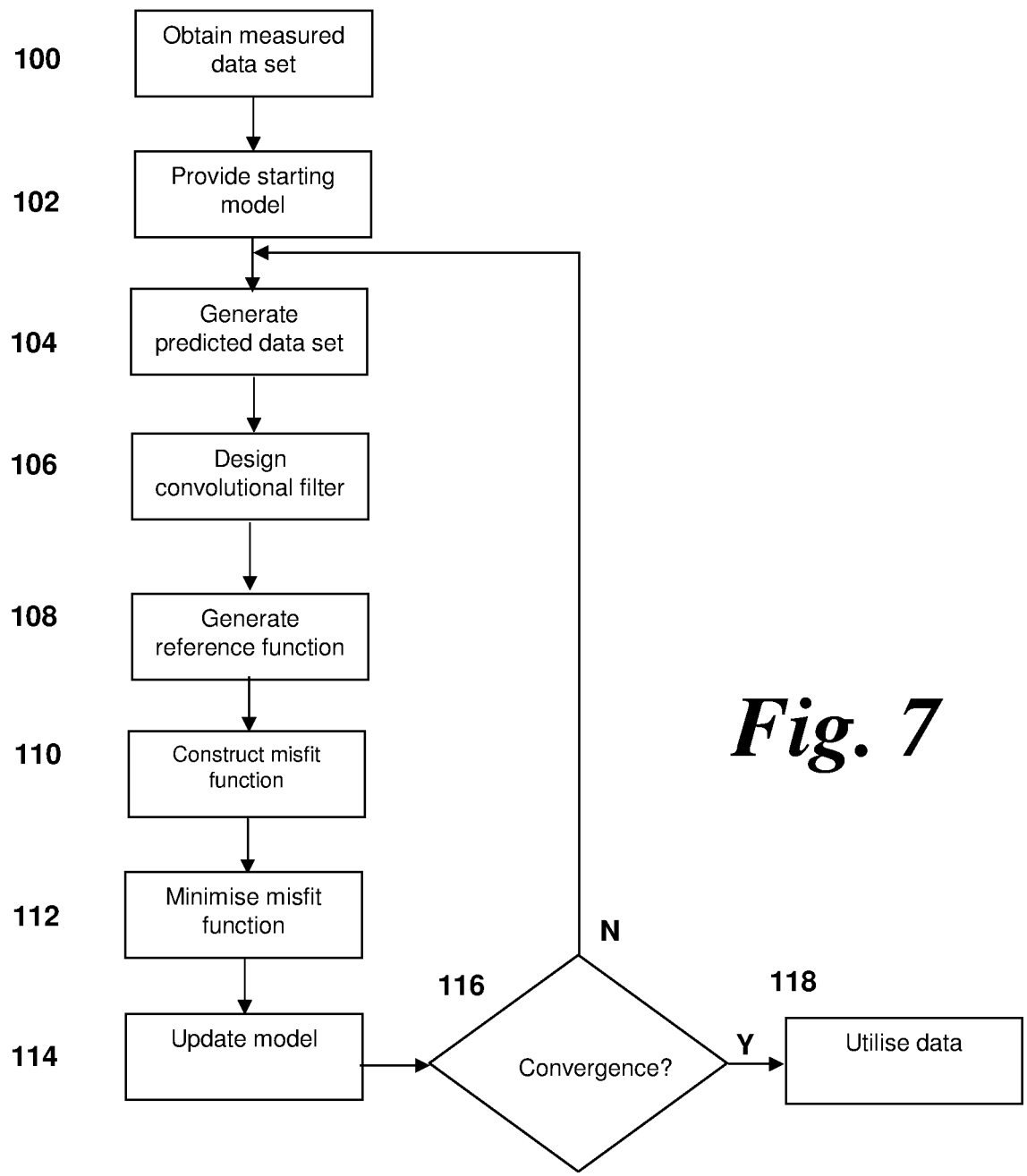
FIG. 7 shows a method according to a first embodiment of the present disclosure.

A method according to the present disclosure will now be described with reference to FIG. 7. FIG. 7 shows a flow diagram of a first embodiment of the present disclosure.

Step 100: Obtain Observed Seismic Data Set

Initially, it is necessary to obtain a set of experimentally gathered seismic data in order to initiate subsurface exploration. This may be gathered by an experimental arrangement such as the set up shown and described with reference to FIG. 1.

The gathered seismic data may be optionally pre-processed in various ways including by propagating numerically to regions of the surface or subsurface where experimental data have not been acquired directly. The skilled person would readily be able to design and undertake such pre-processing as might be necessary or desirable. With or without such pre-processing, the resultant seismic dataset representing experimentally-gathered data is known as an "observed seismic data set".

Figure 1:
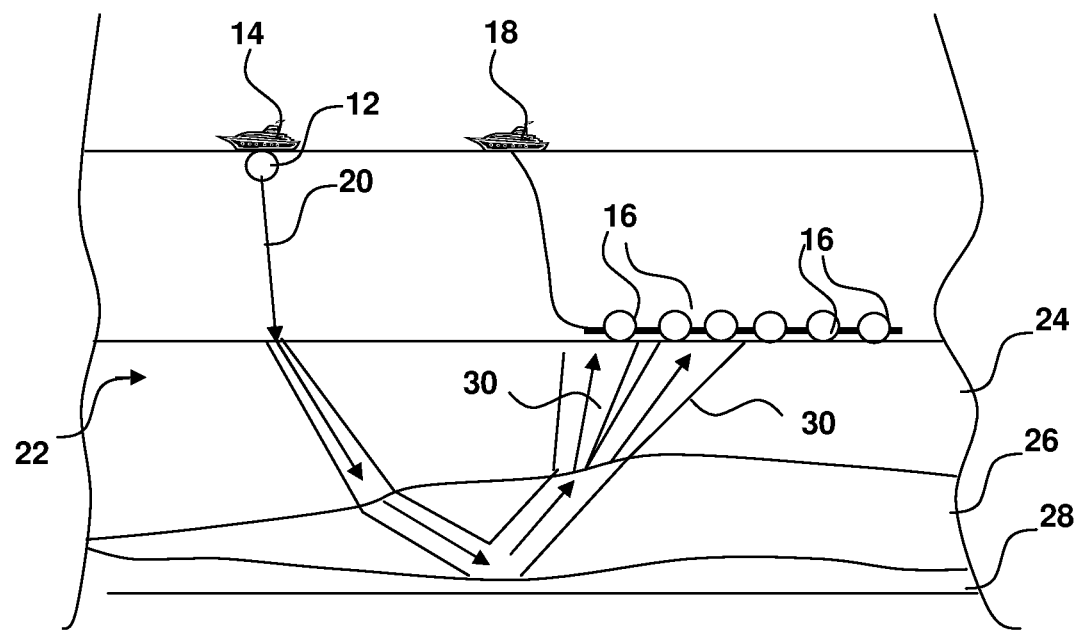
FIG. 1 is a schematic illustration of a typical seismic survey experiment in which seismic traces are obtained from an undersea portion of the Earth.
Figure 2:
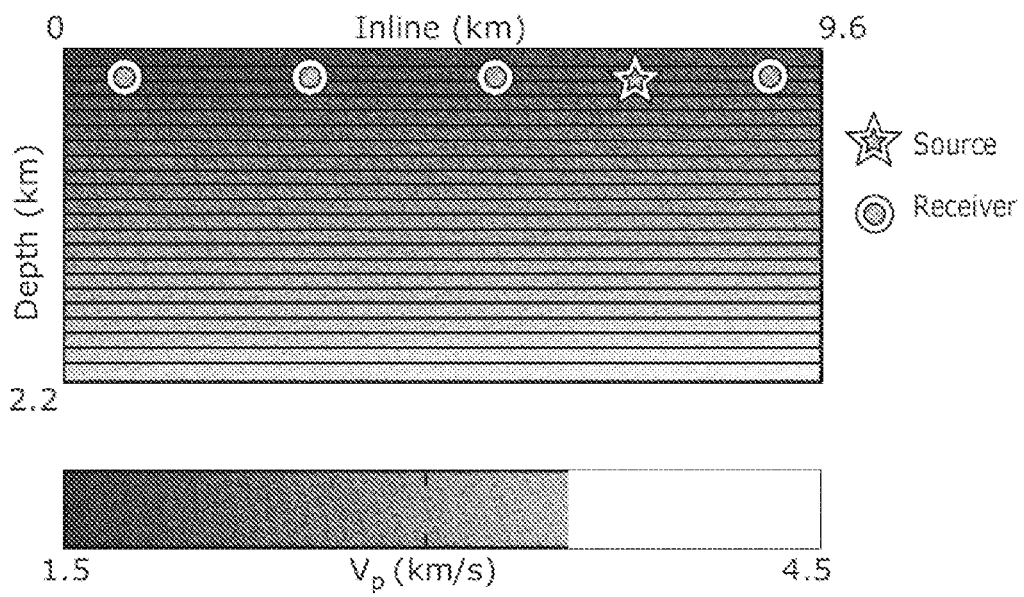
FIG. 2 is a schematic illustration of a basic starting model for full waveform inversion modelling.
Figure 3:
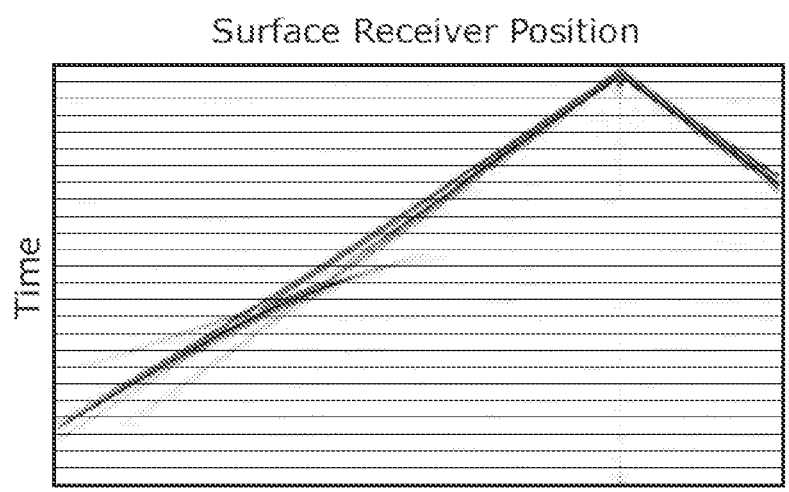
FIG. 3 is a schematic illustration of modelled seismic trace data generated from the basic starting model of FIG. 2 for an individual seismic shot.
Figure 4:
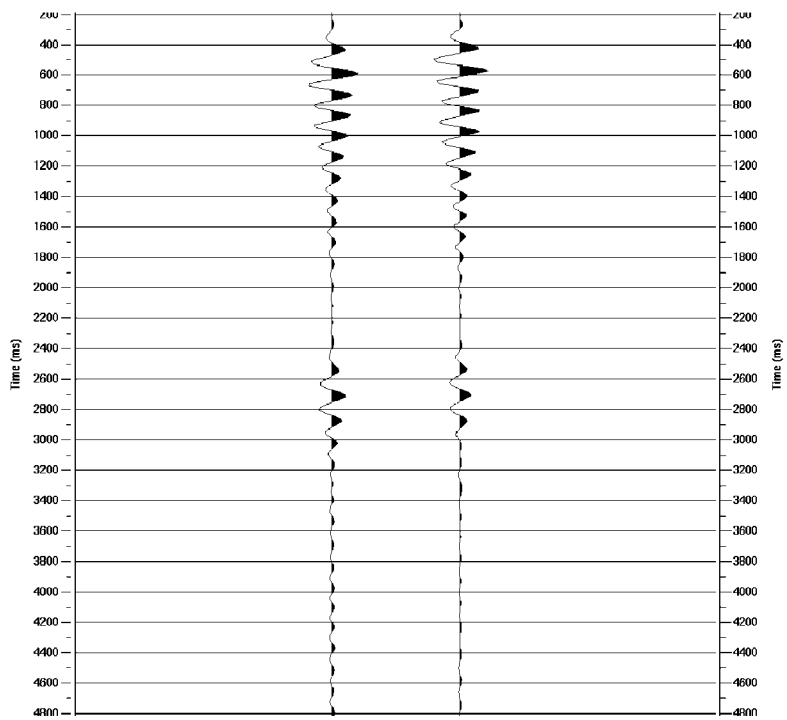
FIG. 4 shows seismic trace data for observed and predicted seismic data sets as a function of time.

As shown in FIG. 1, a large number of receivers or detectors 16 are positioned at well-known positions on the surface of the portion of the Earth to be explored. The detectors 16 may be arranged in a two dimensional (such as a line) or a three dimensional (such as a grid or plurality of lines) arrangement. The physical location of the detectors 16 is known from, for example, location tracking devices such as GPS devices. Additionally, the location of the source 12 is also well known by similar location tracking means.

The observed seismic data set may comprise multiple source 12 emissions known in the art as "shots". The data comprises pressure as a function of receiver position (on the x-axis) with respect to time (on the y-axis). This is because, in general, a detector such as a hydrophone measures the scalar pressure at its location. However, other arrangements may be used.

The seismic trace data comprises a plurality of observed data points. Each measured discrete data point has a minimum of seven associated location values—three spatial dimensions (x, y and z) for receiver (or detector) position (r), three spatial dimensions (x, y, z) for source location (s), and one temporal dimension measuring the time of observation relative to the time of source initiation, together with pressure magnitude data. The seven coordinates for each discrete data point define its location in space and time.

The seismic trace data also comprises one or more measurement parameters which denote the physical property being measured. In this embodiment, a single measurement parameter, pressure is measured. The observed data set is defined as $d_{obs}(r,s,t)$ and, in this embodiment, is in the time domain. For clarity, the following discussion considers a single source-receiver pair and so r, s are not needed.

However, it is possible to measure other parameters using appropriate technology; for example, to measure the velocity or displacements of particles in three spatial dimensions in addition to the pressure. The present disclosure is applicable to the measurement of these additional variables.

The actual gathering of the seismic data set is described here for clarity. However, this is not to be taken as limiting and the gathering of the data may or may not form part of the present disclosure. The present disclosure simply requires a real-world observed seismic data set upon which analysis can be performed to facilitate subsurface exploration of a portion of the Earth. The method now proceeds to step 102.

Step 102: Provide Starting Model

At step 102, an initial starting model of the specified subsurface portion of the Earth is provided. The model may be provided in either a two dimensional or a three dimensional form. Whilst the illustrated examples are of a two-dimensional form, the skilled person would be readily aware that the present disclosure is applicable to three dimensional approaches.

The generated model consists of values of the coefficient $V_p$ and, possibly, other physical values or coefficients, typically defined over a discrete grid representing the subsurface. Such starting models are routinely generated and represent the general trends of the major features within the subsurface region to be modelled and could be readily generated by the skilled person. As discussed above, it is normally necessary to provide a starting model of high accuracy to ensure non-cycle skipped convergence. However, in the case of the present disclosure a less accurate initial model could be used. This may reduce the required time and resources to generate the starting model whilst still enabling accurate convergence.

Predicted seismic data may be generated based on an analysis of the acoustic isotropic two-way wave equation as set out below in equation 17):

$$\frac{1}{c^2}\frac{\partial^2 p}{\partial t^2} - \rho \nabla \cdot \left(\frac{1}{\rho} \nabla p\right) = s \quad \quad 17)$$

where the acoustic pressure p and driving source s vary in both space and time, and the acoustic velocity c and density ρ vary in space. This equation applies to small-amplitude pressure waves propagating within an inhomogeneous, isotropic, non-attenuating, non-dispersive, stationary, fluid medium. It is relatively straightforward to add elastic effects, attenuation and anisotropy to the wave equation. Introduction of these parameters changes the detailed equations and numerical complexity, but not the general approach.

The wave equation 17) represents a linear relationship between a wave field p and the source s that generates the wave field. After discretization (with, for example, finite differences) we can therefore write equation 17) as a matrix equation 18):

$$Ap = s \quad \quad 18)$$

where p and s are column vectors that represent the source and wavefield at discrete points in space and time, and A is a matrix that represents the discrete numerical implementation of the operator set out in equation 3):

$$\frac{1}{c^2}\frac{\partial^2}{\partial t^2} - \rho \nabla \cdot \left(\frac{1}{\rho} \nabla\right) \quad \quad 19)$$

Although the wave equation represents a linear relationship between p and s, it also represents a non-linear relationship between a model m and wavefield p. Thus equation 17) can be rewritten as equation 20):

$$G(m) = p \quad \quad 20)$$

where m is a column vector that contains the model parameters. Commonly these will be the values of c (and ρ if density is an independent parameter) at every point in the model, but they may be any set of parameters that is sufficient to describe the model, for example slowness 1/c, acoustic modulus $c^2 \rho$, or impedance cρ.

In equation 20), G is not a matrix. Instead it is a non-linear Green's function that describes how to calculate a wavefield p given a model m. Once the model has been generated, the method then proceeds to step 104.

Step 104: Generate Predicted Data Set

At step 104, a predicted seismic data set is generated. The predicted data is required to correspond to the same source-receiver location data positions as the actual measured trace data so that the modelled and observed data can be compared. In other words, the predicted data set corresponds discrete point to discrete point to the observed dataset. The predicted data set is generated for the same measurement parameter(s) at the same frequency or frequencies.

From the above analysis, predicted seismic data can be generated for one or more physical parameters in the time domain. If done in the frequency domain it could be done for one or more selected frequencies. This forms the predicted seismic data set $d_{pred}$. The method now proceeds to step 106.

Step 106: Design a Convolutional Filter

In step 106, a "convolutional filter", or filters is designed. The aim of the convolutional filter is to take as an input all or part of the predicted data $d_{pred}(r,s)$, and from that generate as an output an approximation to all or part of the observed data $d_{obs}(r,s)$. A filter is designed for each source-receiver pair r,s to generate a set of coefficients specific to particular r,s values. More than one filter may be designed in this step if required.

It is to be understood that the term "convolutional filter" in the present disclosure may have broad applicability. For example, the convolution may be non-causal, it may be applied in one or more dimensions, including spatial, temporal or other dimensions, the number of dimensions and/or number of data points on input need not the same as the number of dimensions or data points on output, the filter may vary in space, in time and/or in other dimensions, and it may involve post-processing following convolution.

The convolutional filter may comprise any generalized convolutional operation that can be described by a finite set of parameters that depend upon both the predicted $d_{pred}(r,s)$ and observed $d_{obs}(r,s)$ data, such that when the convolution and associated operations are applied to all or part of the predicted data $d_{pred}(r,s)$ an accurate or generally approximate model of the observed data is generated.

The skilled person would be readily aware of how to design and apply such convolutional filters in order to match together two datasets. For example, an objective function could be generated and this could be maximized or minimized to achieve the necessary matching. The method proceeds to step 108.

Step 108: Generate Reference Filter

Once the convolutional filter is designed in step 106, an analogous filter is designed such that, when it is applied to an input dataset, the filter will generate an output dataset that provides an equivalent approximation to all or parts of the input dataset. In other words, this filter does not significantly modify the input data other than optionally in simple, predetermined and well-defined ways, for example by scaling in amplitude.

In one embodiment, the reference filter comprises a sequence of zeros and a non-zero value at the zero lag time. This is, in essence, similar to an impulse function centered upon time t=0. This corresponds to an identity filter in that it does not transform the form of the data, although the magnitude of the output data may not necessarily be the same as the input data.

However, other types of reference filter will be apparent to the skilled person. Given a particular form for a convolutional filter, the skilled person would readily know how to design such an identity filter. The method then proceeds to step 110.

Step 110: Construct Misfit Function

At step 110, a misfit (or objective) function is configured. In one example, the misfit function (or objective function) is configured to measure the dis-similarity between the actual filter coefficients and reference filter coefficients. Alternatively, an objective function may be configured that measures similarity; in this case, step 112 will operable to maximize rather than minimize the objective function.

An example of an objective function configured to measure the dis-similarity between a simple one-dimensional convolutional filter in time and a reference function that consist of only one non-zero value at zero lag, would be to weight the convolution filter coefficients by the modulus of their temporal lag. The objective function would then consist of some norm of these weighted coefficients divided by the same norm of the unweighted coefficients. If the $L_2$ norm is used here, then this objective function will provide the least-squares solution, but other norms (for example, the $L_1$ norm) are potentially utilizable.

The norm of the weighted coefficients must be normalized by the norm of the unweighted coefficients in this example otherwise the objective function could be simply minimized by driving the predicted data to large values, and hence driving the filter coefficients to small values.

In this example, the coefficients generated for each source receiver pair r,s in step 106 are weighted as a function of the modulus of the temporal lag. In other words, the coefficients are weighted based on the data position in time for a time domain analysis.

However, it is to be understood that other types of weighting could be used. For example, more complicated functions of the temporal lag are possible such as weighting with a Gaussian function of lag centered on zero lag.

In general two types of weighting are desirable; those that increase monotonically away from zero lag, such as the modulus, and those that decrease monotonically away from zero lag, such as a Gaussian weighting. The former type of weighting will lead to objective functions that should be minimized and the latter type will lead to objective functions that should be maximized. Combinations of these two types are also possible. The skilled person would readily understand how to design such objective functions and how to minimize or maximize them. The method then proceeds to step 112.

Step 112: Minimize or Maximize the Misfit Function

This may be done by any suitable method. In this embodiment, the gradient method is used.

However, in contrast to conventional FWI, the present disclosure seeks to minimize the misfit between the convolutional and reference filters, rather than between the data sets themselves. Therefore, because the convolutional filters are not periodic, cycle skipping does not occur.

In one embodiment, the gradient of the misfit functional is obtained in accordance with conventional FWI, albeit minimizing the filter coefficients. The method then proceeds to step 114.

Step 114: Update Model

At step 114, the model is updated using the gradient obtained in step 116. The model update derives from the gradient of equation 11) i.e. the partial derivative with respect to a point perturbation of the model m at each position. Ultimately gradients from separate shots will summed when forming the final model update.

As with the computational structure of conventional FWI method, this is the result of two wavefields: an incident wavefield emitted by a source at the source location, and a back-propagated wavefield which is emitted by a (multi-point) source located the receiver positions.

As noted above, gradient methods can be enhanced using an approximate form for the Hessian and conjugate directions for the model update. Further a step-length is then calculated to scale the search direction and give the final model update.

For any useful convolutional filter, and for any useful measure of misfit or similarity, as the convolutional filter moves towards the reference filter, the predicted seismic data set will move towards the observed seismic data set. Thus, the starting model will move towards the true model.

With an appropriate choice of convolutional filter and measure of misfit/similarity, this scheme is unaffected or less affected by cycle skipping than is conventional FWI. It can therefore be applied more readily to observed data that lack low frequencies and/or in the absence of a good starting model. The method now proceeds to step 116.

Step 116: Convergence Criteria Met?

At step 116 it is determined whether convergence criteria have been met. For example, when the method is deemed to have reached convergence when the difference between the data sets reaches a threshold percentage or other value. If the criteria as set out above have been met, then the method proceeds to step 118 and finishes with the resultant Earth model generated. If the criteria have not been met, then the method proceeds back to repeat steps 104 to 114 as discussed above.

Step 118: Finish

When, at step 118, it has been determined that the convergence criteria has been met, the method finishes and the modelled subsurface portion of the Earth is deemed to be sufficiently accurate to be used for subsurface exploration. This may involve the direct interpretation of the recovered model, and/or involve the process of depth-migration to generate a subsurface reflectivity image to be used for the identification of subsurface features such as cavities or channels which may contain natural resources such as hydrocarbons. Examples of such hydrocarbons are oil and natural gas.

Once these features have been identified in the subsurface model and/or reflectivity image, then measures can be taken to investigate these resources. For example, survey vessels or vehicles may be dispatched to drill pilot holes to determine whether natural resources are indeed present in these areas.

The method according to the present disclosure has numerous advantages over prior art methods. In experimental tests, the method has proven to be robust against cycle skipping with starting models that have errors that are several times larger than those that are fatal to conventional FWI.

It is also possible to use the above method in conjunction with conventional FWI. For example, the above method may be used initially to refine the starting model. Once the starting model is sufficiently accurate, conventional FWI could be used.

Figure 8:
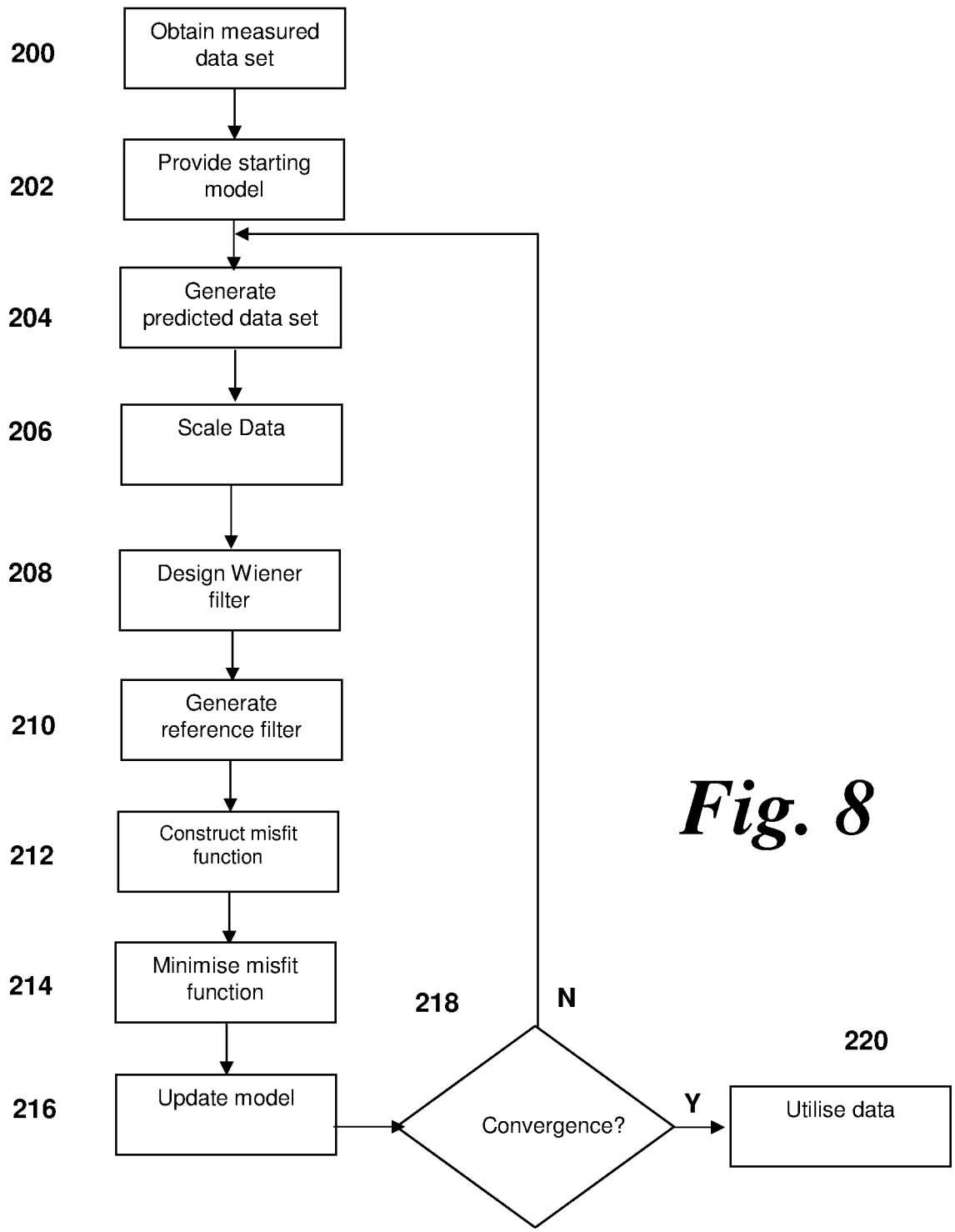
FIG. 8 shows a method according to a second embodiment of the present disclosure.

A second embodiment of the disclosure is illustrated in FIG. 8. The second embodiment focuses on a specific application of Wiener filters to the present disclosure.

Step 200: Obtain Observed Seismic Data Set

Step 200 corresponds substantially to method step 100 of the previous embodiment. Therefore, this will not be described again here. Only the steps which are new to this embodiment of the method of the present disclosure will be described. The method now proceeds to step 202.

Step 202: Provide Starting Model

At step 202, an initial starting model of the specified subsurface portion of the Earth is provided. The model may be provided in either a two dimensional or a three dimensional form. Whilst the illustrated examples are of two-dimensional form, the skilled person would be readily aware that the present disclosure is applicable to three dimensional approaches. The model is generated in this step in accordance with step 102 above.

The generated model consists of values of the coefficient $V_p$ and, possibly, other physical values or coefficients over a discrete grid representing the subsurface. Such starting models are routinely generated and represent the general trends of the major features within the subsurface region to be modelled and could be readily generated by the skilled person. The method then proceeds to step 204.

Step 204: Generate Predicted Data Set

In order to model accurately the subsurface region under investigation, it is necessary to generate predicted data which corresponds to the same source-receiver location data position as the actual measured trace data so that the modelled and observed data can be compared. In other words, the predicted data set corresponds discrete point to discrete point to the observed dataset. The predicted data set is generated for the same measurement parameter(s) at the same frequency or frequencies.

The predicted data set is generated using the full two-way wave equation. In one approach, the modelled trace data may be generated using the time domain full two-way wave equation as set out above.

From the above analysis, predicted seismic data can be generated for one or more physical parameters and at one or more selected frequencies. This forms the predicted seismic data set $d_{pred}(r,s)$. The method now proceeds to step 206.

Step 206: Scale Data

At step 206, the data is scaled so that the predicted $d_{pred}(r,s)$ and observed $d_{obs}(r,s)$ data sets comprise matching root mean square amplitudes. This may be accomplished by any known approach. Either or both of the predicted $d_{pred}(r,s)$ and observed $d_{obs}(r,s)$ data sets may be scaled as appropriate.

Additionally, this step may be optional if it is possible to generate predicted data which intrinsically matches the observed data. The method proceeds to step 208.

Step 208: Design Wiener Filter

A Wiener filter is a convolutional filter of finite length that is operable to convert an input wavelet into a desired output wavelet in a least-squares manner. In other words, if b is the input wavelet, and c is the desired output wavelet, then the Wiener filter w minimizes expression 21).

$$\|b*w-c\|^2 \quad\quad\quad 21)$$

Where expression 21) represents, inter alia, the convolution of input wavelet b with filter w. However, any convolution can be expressed as a matrix operation, and so b*w=c can be expressed as equation 22):

$$Bw=c \quad\quad\quad 22)$$

If w is a column vector of length M, and c is a column vector of length M+N−1, then B is a rectangular matrix with M columns and M+N−1 rows that contains the elements of b arranged as:

$$B = \begin{bmatrix} b_0 & 0 & \cdots & \cdots & 0 \\ b_1 & b_0 & & & 0 \\ b_2 & b_1 & \ddots & & \vdots \\ b_3 & b_2 & & \ddots & 0 \\ \vdots & \vdots & & & b_0 \\ b_{N-1} & b_{N-2} & & & b_1 \\ 0 & b_{N-1} & & & \vdots \\ 0 & 0 & \ddots & & \vdots \\ \vdots & \vdots & & \ddots & b_{N-2} \\ 0 & 0 & \cdots & \cdots & b_{N-1} \end{bmatrix} \quad 23)$$

Based on equation 23), $B^T B$ represents a matrix containing the autocorrelation of b in each column with the zero lag on the main diagonal, and $B^T c$ is the cross-correlation of b and c. The solution to the least squares problem in expression 21) is now:

$$w = (B^T B)^{-1} B^T c \quad 24)$$

Therefore, the approach is to find the auto-correlation $B^T B$ of the input trace b, the cross-correlation $B^T c$ of the input trace with the desired output trace c, and deconvolve the latter using the former. Because of the Toeplitz structure of B, fast algorithms (such as the Levinson algorithm) to find the filter coefficients if B is square which can be ensured by suitably padding b and c with zeros. In practice, equation 25) would be solved:

$$w = (B^T B + \lambda I)^{-1} B^T c \quad 25)$$

This approach can be applied to FWI. At each receiver, for each source, a Wiener filter w can be designed that operates on the observed seismic data set dobs to convert the observed seismic data set $d_{obs}$ into the predicted data set $d_{pred}$. In this embodiment, the filter w operates to convert the observed data into the predicted data. The third embodiment discloses an alternative approach. Equation 26) and 27) denote the approach of this embodiment.

$$d_{obs} * w = d_{pred} \quad 26)$$

$$w = (B^T B)^{-1} B^T d_{pred} \quad 27)$$

Here B is the matrix representation of convolution by $d_{obs}$, and $B^T$ is the matrix representation of cross-correlation with $d_{obs}$. The method proceeds to step 210.

Step 210: Generate Reference Filter

Once the convolutional filter is designed in step 208, an analogous convolutional filter is designed such that, when applied to an input dataset, this reference filter will generate an output dataset that provides an equivalent approximation to all or parts of the input dataset. In other words, the reference filter does not modify the input data in essence.

In one embodiment, the reference filter comprises a sequence of zeros and a value of one at the zero lag time. This is, in essence, similar to an impulse function centered upon time t=0. The method then proceeds to step 212.

Step 212: Construct Misfit Function

At step 212, a misfit function is configured. The misfit function (or objective function) is configured to measure the dis-similarity between the actual filter coefficients and reference filter coefficients. Alternatively, an objective function may be configured that measures similarity; in this case, step 214 (described later) will operable to maximize rather than minimize the objective function.

An example of an objective function configured to measure the dis-similarity between a simple one-dimensional convolutional filter in time and a reference function that consist of only one non-zero value at zero lag, would be to weight the convolution filter coefficients by the modulus of their temporal lag. The objective function would then consist of some norm of these weighted coefficients divided by the same norm of the unweighted coefficients. If the $L_2$ norm is used here, then this objective function will provide the least-squares solution, but other norms are possible and potentially desirable.

The norm of the weighted coefficients must be normalized by the norm of the unweighted coefficients in this example otherwise the objective function could be simply minimized by driving the predicted data to large values, and hence driving the filter coefficients to small values.

In this example, the coefficients generated for each source receiver pair r,s in step 208 are weighted as a function of the modulus of the temporal lag. In other words, the coefficients are weighted based on the data position in time for a time domain analysis.

However, it is to be understood that other types of weighting could be used. For example, more complicated functions of the temporal lag are possible such as weighting with a Gaussian function of lag centered on zero lag. In general two types of weighting are desirable; those that increase monotonically away from zero lag, such as the modulus, and those that decrease monotonically away from zero lag, such as a Gaussian weighting. The former type of weighting will lead to objective functions that should be minimized and the latter type will lead to objective functions that should be maximized. Combinations of these two types are also possible. The skilled person would readily understand how to design such objective functions and how to minimize or maximize them.

A model is then sought that makes the Wiener filters as close as possible to being just a spike at zero time lag. In other words, the predicted and modelled data matches apart from a scale factor. Therefore, a model m is desired that minimizes or maximizes:

$$f = \frac{\frac{1}{2}\|Tw\|^2}{\|w\|^2} \quad 28)$$

where w is a column vector containing all the Wiener filter coefficients, and T is the weighting function, for example the modulus of temporal lag. The filters vary with source and receiver position, and with the model. The Wiener filters are obtained by solving equation (27). The method proceeds to step 214.

Step 214: Minimize Misfit Function

This may be done by any suitable method. In this embodiment, the gradient method is used. In this embodiment, the gradient is straightforward to derive from equation 28):

$$\frac{\partial f}{\partial m} = -p^T \left(\frac{\partial A}{\partial m}\right)^T A^{-T} \left\{ B(B^T B)^{-1} \left(\frac{T^2 - 2fI}{w^T w}\right) w \right\} \quad 29)$$

This is the usual expression for FWI, but now the adjoint source that must be used in the back propagation is no longer simply the residual data but is instead the entity represented by:

$$\left\{ B(B^T B)^{-1} \left( \frac{T^2 - 2jT}{w^T w} \right) w \right\}.$$

As set out above, in contrast to conventional FWI, the present disclosure seeks to minimize the difference between the convolutional and reference filters, rather than between the data sets themselves. Therefore, because the convolutional filters are not periodic, cycle skipping does not occur.

The gradient can be obtained based on equation 29) as follows. A set of Wiener filters is found in step 208, one filter per data trace. The filter coefficients are normalized by their inner product, trace-by-trace. The normalized coefficients are weighted by a function of temporal lag. The resultant sequence is deconvolved by the auto-correlation of the observed data, and convolved with the observed data. This forms an adjoint source for each source-receiver pair. These adjoint sources are then back-propagated and combined in the normal way with the forward wavefield to produce the gradient. The method then proceeds to step 216.

Step 216: Update Model

At step 216, the model is updated using the gradient obtained in step 214. The model update derives from the gradient of equation 11) i.e. the partial derivative with respect to a point perturbation of the model m at each position. Ultimately gradients from separate shots will summed when forming the final model update.

As with the computational structure of conventional FWI method, this is the product of two wavefields: an incident wavefield emitted by a source at source location back-propagated wavefield which is emitted by a (multi-point) source located the receiver positions.

As noted above, gradient methods can be enhanced using an approximate form for the Hessian and conjugate directions for the model update. Further a step-length is then calculated to scale the search direction and give the final model update.

For any useful convolutional filter, and for any useful measure of difference or similarity, as the convolutional filter moves towards the reference filter, the predicted seismic data set will move towards the observed seismic data set. Thus, the starting model will move towards the true model.

With an appropriate choice of convolutional filter and measure of difference/similarity, this scheme is unaffected or less affected by cycle skipping than is conventional FWI. It can therefore be applied more readily to observed data that lack low frequencies and/or in the absence of a good starting model. The method now proceeds to step 218.

Step 218: Convergence Criteria Met?

At step 218 it is determined whether convergence criteria have been met. For example, when the method is deemed to have reached convergence when the difference between the data sets reaches a threshold percentage. If the criteria as set out above have been met, then the method proceeds to step 220 and finishes with the resultant Earth model generated. If the criteria have not been met, then the method proceeds back to repeat steps 204 to 216 as discussed above.

Step 220: Finish

When, at step 220, it has been determined that the convergence criteria has been met, the method finishes and the modelled subsurface portion of the Earth is deemed to be sufficiently accurate to be used for subsurface exploration. This may involve the direct interpretation of the recovered model, and/or involve the process of depth-migration to generate a subsurface reflectivity image to be used for the identification of subsurface features such as cavities or channels which may contain natural resources such as hydrocarbons. Examples of such hydrocarbons are oil and natural gas.

Once these features have been identified in the subsurface model and/or reflectivity image, then measures can be taken to investigate these resources. For example, survey vessels or vehicles may be dispatched to drill pilot holes to determine whether natural resources are indeed present in these areas.

Figure 5:
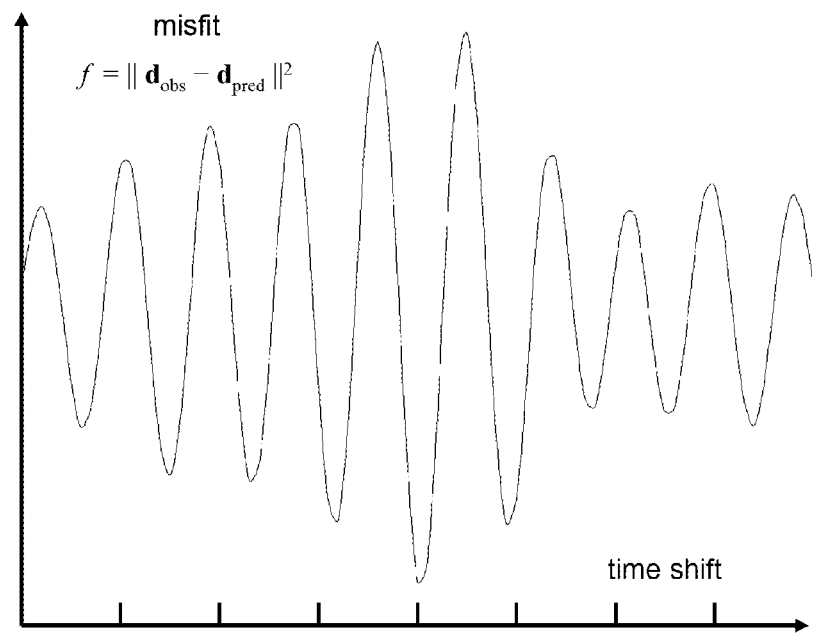
FIG. 5 shows the misfit of the observed and predicted seismic data sets in FIG. 4 as a function of time for conventional FWI.
Figure 6A:
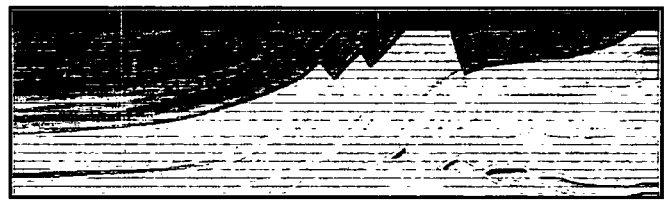
FIG. 6 a) to f) show examples of starting models and the resulting final models obtained from conventional full waveform inversion modelling.
Figure 6B:
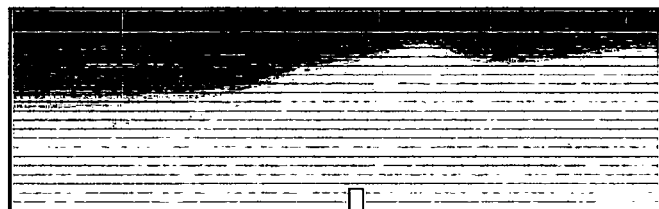
Figure 6C:
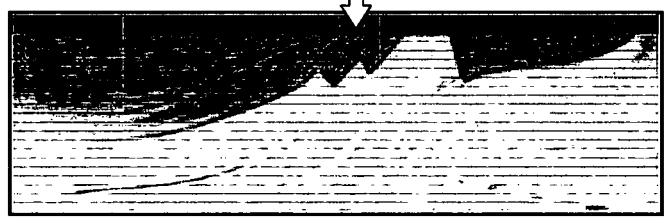
Figure 6D:
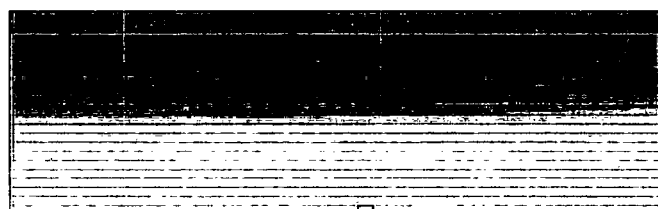
Figure 6E:
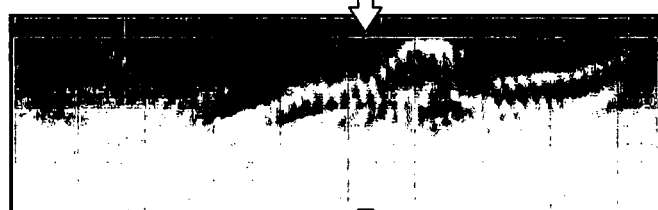
Figure 6F:
Figure 9:
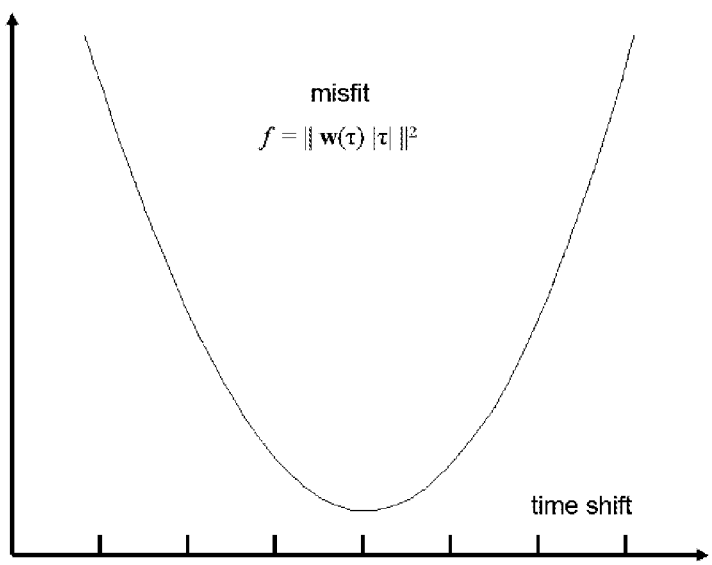
FIG. 9 shows the misfit of the observed and predicted seismic data sets in FIG. 4 as a function of time using the method of the present disclosure.

FIG. 9 shows an example of a misfit function as a function of time, similar to FIG. 5 for conventional FWI. As can be seen, the misfit is not cyclic and so cycle skipping is eliminated.

Figure 10:
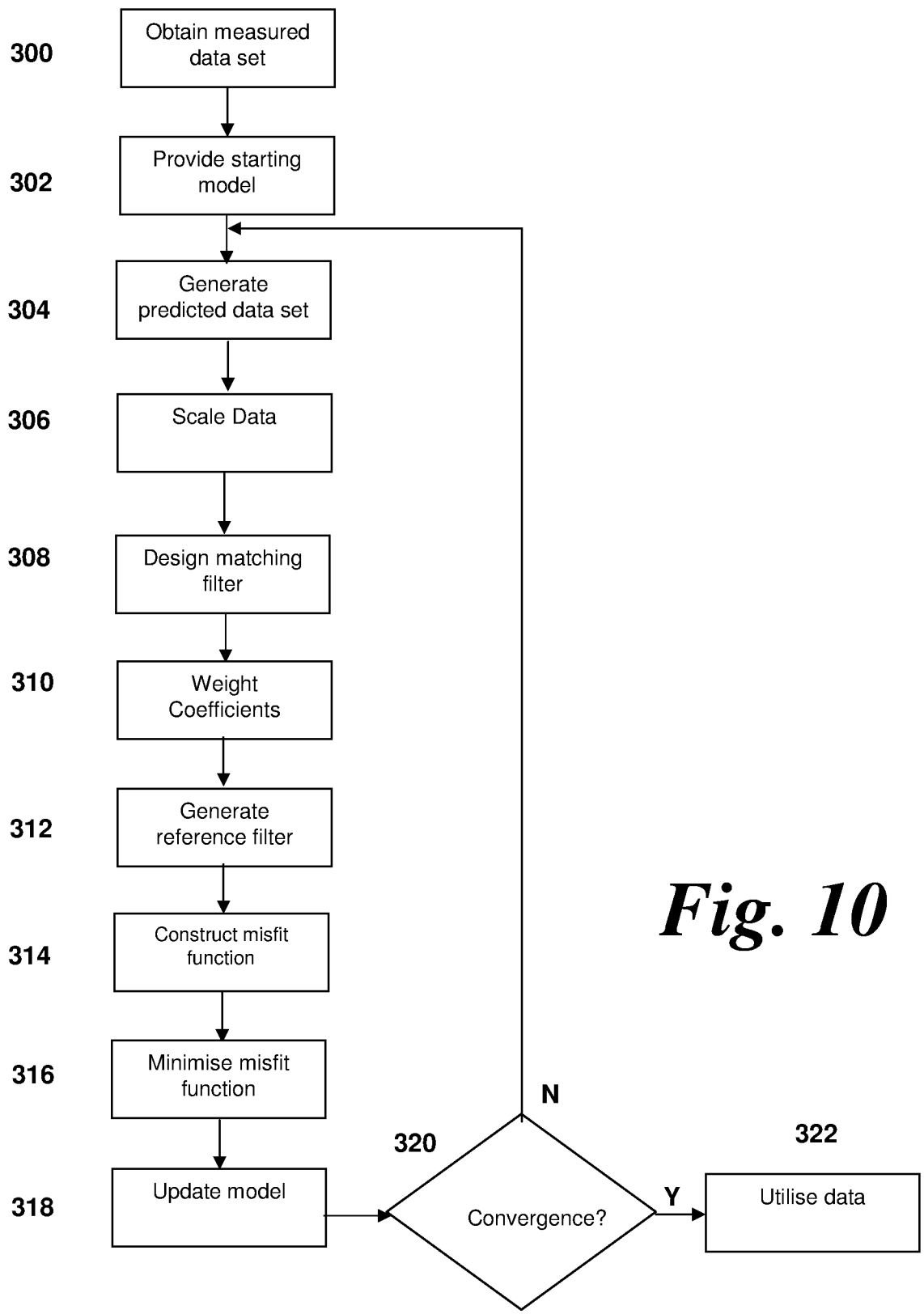
FIG. 10 shows a method according to a third embodiment of the present disclosure.

A third embodiment of the disclosure is illustrated in FIG. 10. The third embodiment focuses on an alternative application of Wiener filters to the present disclosure.

Step 300: Obtain Observed Seismic Data Set

Step 300 corresponds substantially to method steps 100 and 200 of the previous embodiments. Therefore, this will not be described again here. Only the steps which are new to this embodiment of the method of the present disclosure will be described. The method then proceeds to step 302.

Step 302: Provide Starting Model

At step 302, an initial starting model of the specified subsurface portion of the Earth is provided. The model may be provided in either a two dimensional or a three dimensional form. Whilst the illustrated examples are of two dimensional form, the skilled person would be readily aware that the present disclosure is applicable to three dimensional approaches. The model is generated in this step in accordance with step 102 above.

The generated model consists of values of the coefficient $V_p$ and, possibly, other physical values or coefficients over a discrete grid representing the subsurface. Such starting models are routinely generated and represent the general trends of the major features within the subsurface region to be modelled and could be readily generated by the skilled person. The method then proceeds to step 304.

Step 304: Generate Predicted Data Set

In order to model accurately the subsurface region under investigation, it is necessary to generate predicted data which corresponds to the same source-receiver location data position as the actual measured trace data so that the modelled and observed data can be compared. In other words, the predicted data set corresponds discrete point to discrete point to the observed dataset. The predicted data set is generated for the same measurement parameter(s) at the same frequency or frequencies.

The predicted data set is generated using the full two-way wave equation. In one approach, the modelled trace data may be generated using the time domain full two-way wave equation as set out above.

From the above analysis, predicted seismic data can be generated for one or more physical parameters and at one or more selected frequencies. This forms the predicted seismic data set $d_{pred}(r,s)$. The method now proceeds to step 306.

Step 306: Scale Data

At step 306, the data is scaled so that the predicted $d_{pred}(r,s)$ and observed $d_{obs}(r,s)$ data sets comprise matching root mean square amplitudes. This may be accomplished by any known approach. Either or both of the predicted $d_{pred}$(r,s) and observed $d_{obs}$(r,s) data sets may be scaled as appropriate.

Additionally, this step may be optional if it is possible to generate predicted data which intrinsically matches the observed data. The method proceeds to step 308.

Step 308: Design Wiener Filter

In step 308, the Wiener filter is designed. In this embodiment, it is desired to design a filter w which converts the predicted data set $d_{pred}$ into the observed data $d_{obs}$. In other words, equations 30) and 31) set out these parameters:

$$d_{pred} * x = d_{obs} \quad \quad 30)$$

$$x = (C^T C)^{-1} C^T d_{obs} \quad \quad 31)$$

where C is the matrix representation of convolution by $d_{pred}$. A Wiener filter can be designed on this basis. The method proceeds to step 310.

Step 310: Weight Coefficients

At step 310, the coefficients generated for each source receiver pair r,s in step 308 are weighted as a function of the modulus of the temporal lag. As set out in equation 32), T is a diagonal matrix arranged to scale the Wiener filter coefficients as a function of the modulus of the time lag.

Therefore, if the value of this function increases as the lag increases, then it is desired to minimize functional g. Conversely, if the function decreases as the lag increases, then g should be maximized. The former is more likely to provide better resolution, whilst the latter approach is likely to be more resistant to noise.

Step 312: Generate Reference Filter

Once the convolutional filter is designed in step 308, an analogous convolutional filter is designed such that, when applied to an input dataset, the filter will generate an output dataset that provides an equivalent approximation to all or parts of the input dataset.

In other words, this filter does not modify the input data in essence and so is denoted the "reference filter", which comprises the "auto" parameter set.

In one embodiment, the reference filter comprises a sequence of zeros and a value of one at the zero lag time (i.e. at the receiver). This is, in essence, similar to an impulse function centered upon time t=0. The method then proceeds to step 314.

Step 314: Construct Misfit Function

At step 314, a misfit function is configured. The misfit function (or objective function) is configured to measure the difference between the auto and cross parameter sets. Alternatively, the misfit function may be operable to measure similarity and seek to maximize it.

A model is then sought that makes the Wiener filters as close as possible to being just a spike at zero time lag. In other words, the predicted and modelled data matches apart from a scale factor. Therefore, a model m is desired that minimizes or maximizes:

$$g = \frac{\frac{1}{2} \|Tx\|^2}{\|x\|^2} \quad \quad 32)$$

where x is a column vector containing all the Wiener filter coefficients, and T is a weighting function applied in step 210. The filters vary with source and receiver position, and with the model. The Wiener filters are obtained by solving equation (31). Equation 32) is a normalised misfit (or objective) function due the normalisation by a norm of the column vector x. This eliminates, or reduces, the sensitivity of the function to the scale of the reference filter coefficients. The method proceeds to step 316.

Step 316: Minimize Misfit Function

This may be done by any suitable method. In this embodiment, the gradient method is used. In this embodiment, the gradient is straightforward to derive from equation 32):

$$\frac{\partial g}{\partial m} = -p^T \left(\frac{\partial A}{\partial m}\right)^T A^{-T} \left\{ X^T C (C^T C)^{-1} \left(\frac{2gI - T^2}{x^T x}\right) x \right\} \quad \quad 33)$$

where $X^T$ represents cross-correlation with the Wiener filter generated in step 308.

Therefore, in summary, to find the gradient in this approach, the Wiener filter is found in step 308, it is normalized, weighted as a function of lag, deconvolved using the auto-correlation of the predicted data, convolved with the predicted data, and cross-correlated with the Wiener filter. This forms an adjoint source for each source-receiver pair. These adjoint sources are then back-propagated as normal, and combined with the forward wavefield to generate the gradient. The method then proceeds to step 318.

Step 318: Update Model

At step 318, the model is updated using the gradient obtained in step 316. The model update derives from the gradient of equation 33) i.e. the partial derivative with respect to a point perturbation of the model m at each position. Ultimately gradients from separate shots will summed when forming the final model update.

For any useful convolutional filter, and for any useful measure of difference or similarity, as the convolutional filter moves towards the reference filter, the predicted seismic data set will move towards the observed seismic data set. Thus, the starting model will move towards the true model.

With an appropriate choice of convolutional filter and measure of difference/similarity, this scheme is unaffected or less affected by cycle skipping than is conventional FWI. It can therefore be applied more readily to observed data that lack low frequencies and/or in the absence of a good starting model. The method now proceeds to step 320.

Step 320: Convergence Criteria Met?

At step 320 it is determined whether convergence criteria have been met. For example, when the method is deemed to have reached convergence when the difference between the data sets reaches a threshold percentage. If the criteria as set out above have been met, then the method proceeds to step 322 and finishes with the resultant Earth model generated. If the criteria have not been met, then the method proceeds back to repeat steps 304 to 318 as discussed above.

Step 322: Finish

When, at step 322, it has been determined that the convergence criteria has been met, the method finishes and the modelled subsurface portion of the Earth is deemed to be sufficiently accurate to be used for subsurface exploration. This may involve the direct interpretation of the recovered model, and/or involve the process of depth-migration to generate a subsurface reflectivity image to be used for the identification of subsurface features such as cavities or channels which may contain natural resources such as hydrocarbons. Examples of such hydrocarbons are oil and natural gas.

Once these features have been identified in the subsurface model and/or reflectivity image, then measures can be taken to investigate these resources. For example, survey vessels or vehicles may be dispatched to drill pilot holes to determine whether natural resources are indeed present in these areas.

Figure 11:
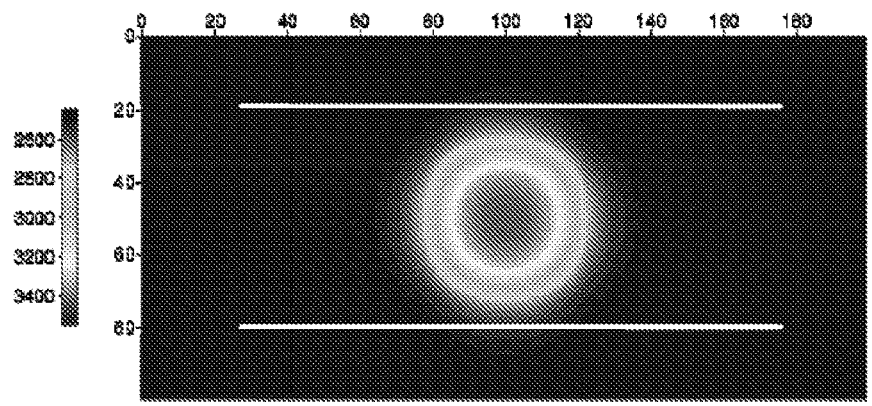
FIG. 11 shows a trial model for testing the accuracy of FWI.

The effectiveness of the above-described embodiments is illustrated with reference to FIGS. 11 to 13. FIG. 11 shows a relatively extreme subsurface model including a strong anomaly to resolve.

Figure 12:
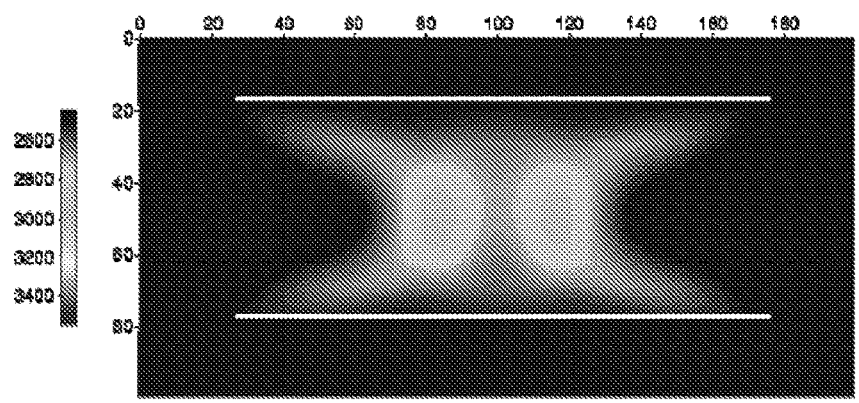
FIG. 12 shows the convergence achieved for conventional FWI relative to said trial model.

FIG. 12 shows a model derived from conventional FWI. As shown, the model fails to converge correctly due to cycle skipping. Consequently, the minimized model bears little resemblance to the actual model as set out in FIG. 11.

Figure 13:
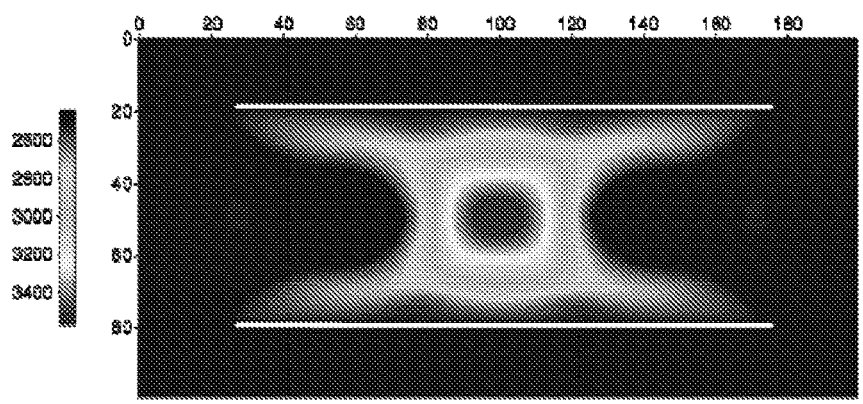
FIG. 13 shows the convergence achieved for the method of the present disclosure relative to said trial model.

In contrast, FIG. 13 shows the model recovered using the method of the present disclosure. As shown, the model is fully recovered subject only to the limitations of geometry and bandwidth. Clearly, the present disclosure enables accurate modelling of complex subsurface features where conventional FWI fails.

A further example of the effectiveness of the above-described embodiments is illustrated with reference to FIGS. 14 to 17.

Figure 14:
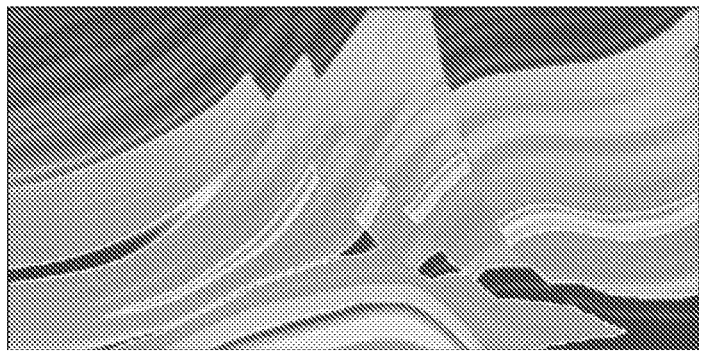
FIG. 14 shows a further, more complex trial model for testing the accuracy of FWI.

FIG. 14 shows a Marmousi model used to test the method of the present disclosure.

Figure 15:
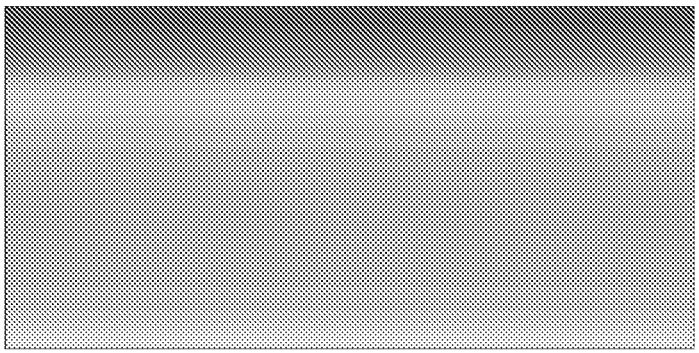
FIG. 15 shows an inaccurate starting model with which to begin the inversion.

FIG. 15 shows a simple and inaccurate starting model used to test the present disclosure.

Figure 16:
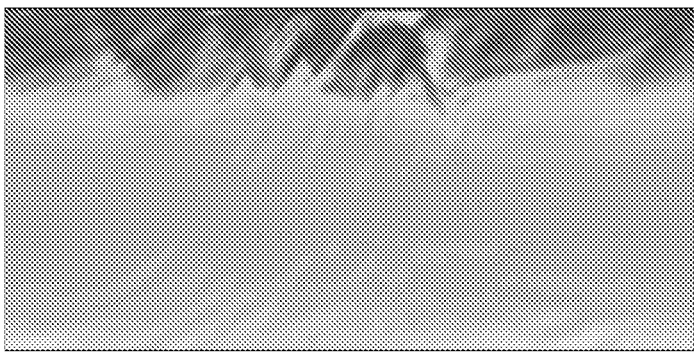
FIG. 16 shows the convergence achieved for conventional FWI relative to the trial model of FIG. 14.

FIG. 16 shows a model derived from conventional FWI. The data used here had a dominant frequency of 10 Hz. As shown, the resulting model bears little resemblance to the correct model, which is significantly cycle skipped with respect to the inaccurate starting model. In other words, the model fails to converge correctly due to cycle skipping. Consequently, the minimized model bears little resemblance to the actual model as set out in FIG. 14.

Figure 17:
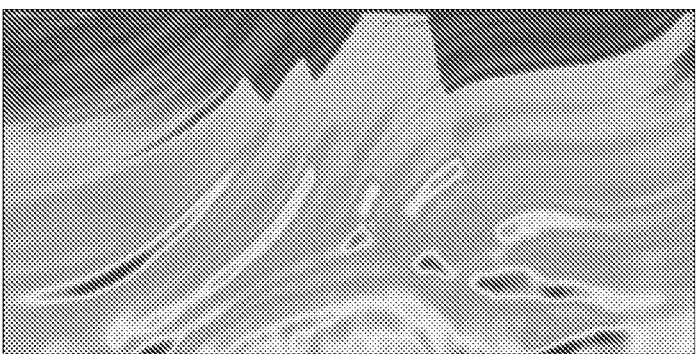
FIG. 17 shows the convergence achieved for the method of the present disclosure relative to said trial model of FIG. 14.

In contrast, FIG. 17 shows the model recovered using the method of the present disclosure. As shown, the model is fully recovered subject only to the limitations of geometry and bandwidth. Clearly, the present disclosure enables accurate modelling of complex subsurface features where conventional FWI fails.

Variations of the above embodiments will be apparent to the skilled person. The precise configuration of hardware and software components may differ and still fall within the scope of the present disclosure.

Firstly, whilst the above embodiments are illustrated with regard to one dimensional Wiener filters, multidimensional filters could also be used. In the simple one-dimensional scheme above, the filter for each source-receiver pair is designed only using data from that source-receiver pair. The scheme is also implemented in time—the two sequences that are being matched represent data that varies in time, and the Wiener filter has its coefficients arranged by temporal lag.

However, it is possible to implement an analogous scheme in multiple dimensions in space, or in a mixture of time and one or more space dimensions, or in any of many transformed spaces, for example in intercept-slowness (tau-p) space, in frequency-wavenumber (f-k) space, or in parabolic Radon space.

Considering a single source and a single receiver, then, using a source estimate, the predicted data can be calculated from that source not only at the receiver also in a three dimensional volume around it. For that receiver, a one-dimensional observed dataset and a four-dimensional predicted dataset is now available. That is, three space dimensions plus time. Now a convolutional filter can be designed that takes all or some 1D, 2D or 3D subset of this 4D predicted dataset as input and generates the 1D observed dataset as output. This can be done in any of steps 106, 208 or 308.

If this convolutional filter is a multi-dimensional Wiener convolutional filter, then the corresponding reference filter will be unity at the coefficient that corresponds to zero lag in time and zero lag in all of the space dimensions—that is at the position of the receiver—and it will be zero everywhere else.

In this context, the method remains unchanged but now a 1D, 2D, 3D or 4D convolutional filter can be designed, and this can be combined with an appropriate function of all the temporal and spatial lags involved. The associated misfit functional can then be minimized.

In practice, it is unlikely to be necessary to use all four dimensions together because the computational effort would be large. However, different subsets of dimensions on different iterations may be required.

Further, it is possible to generate data at or around the receiver, for multiple source locations, and for different source initiation times. It takes four dimensions to describe the source time and location. Therefore, up to eight dimensions of predicted data are available. A filter can be designed using any combination of these as input though in a practical scheme we would be unlikely to want to use all of them simultaneously. There is also redundancy between the two time dimensions unless at least one space dimension is also involved in designing the filter.

The dimensionality of the output can also be increased. Thus, rather than design a filter that seeks to match the observed data in just one dimension, the observed data could be matched in two or more dimensions, for example with the observed data predicted in time over a two-dimensional array of surface receivers, giving a 3D output from the convolutional filter.

Equivalent schemes may also be generated that match the observed data to the predicted data. In this case, we would use observed data from multiple receivers and/or multiple sources as input, generating predicted data over the same multi-dimensional volume or some subset of it.

These multi-dimensional filters could be extended by applying them to virtual sources and receivers located anywhere within the sub-surface including at the source position.

Further, whilst the above embodiments have been illustrated in the time domain, frequency domain analysis could also be used. The different frequency components can be extracted through the use of a Fourier transform. Fourier transforms and associated coefficients are well known in the art. Since only a few frequency components may be required, a discrete Fourier transform may be computed from the inputted seismic trace data. Alternatively, a conventional fast Fourier transform (FFT) approach may be used. As a further alternative, partial or full Fourier transforms may be used. The Fourier transform may be taken with respect to complex or real valued frequencies.

One or more observed data sets at one or more frequencies may be extracted. For example, a plurality of observed data sets may be provided having frequency components of, for example, 4.5 Hz, 5 Hz and 5.5 Hz. These 3 frequencies can be inverted individually with the output of one becoming the input of the next.

As can be understood, further variations to this method are possible. For example, the process could be applied using the reverse filter, that using a filter that takes the observed data as input and that generates an approximation to the predicted data as output;

The data could be pre-processed in any desired manner the observed and/or field data prior to the formation of the Wiener filter coefficients.

The auto and/or cross correlation functions could be pre-processed in order to form the Wiener filter.

The Wiener filter coefficients and/or the weighted Wiener coefficients could be processed before forming the quantity to be minimized or maximized. Alternatively, post-processing could be performed on the quantity to be minimized or maximized.

The scheme could be applied to data, to models, and/or to filter coefficients that have been transformed into some other domain or domains including but not limited to the single or multi-dimensional Fourier domain, the Laplace domain, the Radon domain, the wavelet domain, the curvelet domain.

The observed and/or predicted data could be transformed into a sequence of complex numbers, for example by forming an imaginary part using the Hilbert transform, such that the Wiener coefficients are themselves complex numbers, and optionally combine this with the minimization of the imaginary portion of the Wiener coefficients.

Additional constraints could be added to the Wiener coefficients including but not limited to constraints generated by the observed data and/or the predicted data and/or the model and/or the other Wiener coefficients and/or the accuracy of the convolutional filter.

Wiener filters could be used that vary continuously or discontinuously in time, in space, with receiver position, with source position, with source-receiver azimuth, with source-receiver offset, with source-receiver midpoint, and/or with other characteristics of the data, the model, the model updates, the source, the receiver, the filer coefficients.

In other words, the Wiener filter need not be one dimensional and may encompass multiple dimensions.

In addition, whilst embodiments have illustrated the use of Wiener filters, the present disclosure is not limited to such filters. The skilled person would readily be aware of other filter types suitable for use with the present disclosure. Non-limiting examples may include: Kalman filters; least mean squares filters; normalized least mean squares filters; and recursive least squares filters.

Further, whilst the present disclosure has been described with reference to a model which involves solving the acoustic wave equation, the present disclosure is equally applicable to the models which involve solving the visco-acoustic, elastic, visco-elastic or poro-elastic wave equation.

Further, whilst the example here has used the scalar parameter of pressure as its focus (i.e. P-waves), it is also possible (with appropriate equipment such as geophones) to measure the particle motion in the receiver location and so determine S-wave parameters. Data so-generated could then be utilized and processed in the present disclosure.

Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

The invention claimed is:

1. A method of subsurface exploration, the method comprising generating a geophysical representation of a portion of the volume of the Earth from a seismic measurement of at least one physical parameter, and comprising the steps of:
providing an observed seismic data set comprising at least three distinct non-zero data values derived from at least three distinct non-zero seismic measured values of said portion of the volume of the Earth;
generating, using a subsurface model of a portion of the Earth comprising a plurality of model coefficients, a predicted seismic data set comprising at least three distinct non-zero data values;
utilizing one or more non-trivial convolutional filters, each filter comprising three or more non-zero filter coefficients and configured to, when convolved with the observed seismic data set, maximize the similarity or minimize the mismatch between the convolved observed data set and the predicted data set;
minimizing and/or maximizing one or more objective functions operable to measure the similarity and/or mismatch between the filter coefficients for the or more non-trivial convolutional filters and at least three reference coefficients of one or more reference filters by modifying at least one model coefficient of said subsurface model of a portion of the Earth to produce an updated subsurface model of a portion of the Earth; and
providing an updated subsurface model of a portion of the Earth for subsurface exploration.

2. The method according to claim 1, wherein said at least one non-trivial convolutional filter is operable to transform at least a portion of said observed seismic data set to render the observed seismic data set and predicted data set approximations of one another.

3. The method according to claim 1, wherein the method further comprises:
utilizing at least one further non-trivial convolutional filter, the at least one further non-trivial convolutional filter comprising three or more non-zero filter coefficients and configured to, when convolved with the predicted seismic data set, maximize the similarity or minimize the mismatch between the convolved observed data set and the convolved predicted data set.

4. The method according to claim 3, wherein the least one non-trivial convolution filter is operable to transform at least a portion of said observed seismic data set and the at least one further nontrivial convolutional filter is operable to transform said predicted data set to render the observed seismic data set and predicted data set approximations of one another.

5. The method according to claim 3, wherein a plurality of further non-trivial convolutional filters is provided.

6. The method according to claim 1, further comprising generating one or more normalized objective functions operable to measure the similarity and/or mismatch between the filter coefficients for the one or more non-trivial convolutional filters and the reference coefficients for the one or more reference filters, wherein the one or more normalized objective function is insensitive or has reduced sensitivity to the relative scaling of the filter coefficients for the one or more non-trivial convolutional filters with respect to the reference coefficients for the one or more reference filters.

7. The method according to claim 6, wherein at least one of said objective functions is normalized by a norm of the filter coefficients of the at least one non-trivial convolutional filter.

8. A method according to claim 7, wherein at least one of said objective functions is normalized by the $L_1$-norm or the $L_2$-norm of the filter coefficients of the at least one non-trivial convolutional filter.

9. The method according to claim 1, wherein a plurality of non-trivial convolutional filters is provided.

10. The method according to claim 1, wherein a plurality of observed seismic data sets and/or a plurality of predicted seismic data sets is provided.

11. The method according to claim 1, wherein one or more of the non-trivial convolutional filters involve convolution in time or space.

12. The method according to claim 1, wherein one or more of the non-trivial convolutional filters involve convolution in more than one dimension.

13. The method according to claim 1, wherein one or more of the non-trivial convolutional filters are selected from the group consisting of: Wiener filters, Kalman filters, least mean square filters, normalized least mean square filters, and recursive least squares filters.

14. The method according to claim 1, wherein one or more of the non-trivial convolutional filters are calculated in the time domain, the temporal-frequency domain, the space domain, or the wave-number domain.

15. The method according to claim 1, wherein the filter coefficients are regularised and/or interpolated between said data sets and/or subsets of said data sets, and/or interpolated between filters.

16. The method according to claim 1, wherein the objective function involves the application of a weighting to the filter coefficients of said at least one non-trivial convolutional filter, and wherein the weighting is dependant upon the temporal lag of said at least one non-trivial convolutional filter.

17. The method according to claim 16, wherein the objective function consists of one or more of: a norm of the weighted convolutional filter coefficients in combination with a norm of the unweighted filter coefficients; a norm of the weighted convolutional filter coefficients divided by a norm of the unweighted filter coefficients; or a norm of the unweighted convolutional filter coefficients divided by a norm of the weighted filter coefficients.

18. The method according to claim 1, wherein at least one of said objective functions comprises one or more of a norm misfit objective function, an $L_1$-norm misfit objective function, or a least-squares misfit objective function.

19. The method according to claim 1, wherein the step of minimizing the one or more objective functions with respect to said model parameters comprises utilizing the gradient of the objective.

20. The method according to claim 1, wherein at least one of the reference filters is a convolutional filter which leaves the dataset to which it is applied unaltered, or approximately unaltered, other than by one or more of: multiplication by a constant, by a shift in time or space, and by a rotation of phase.

21. The method according to claim 1, wherein at least a portion of the observed seismic dataset is numerically propagated to a subsurface region of the model that is spatially removed from the location at which they were originally recorded.

22. The method according to claim 1, further comprising repeating the steps of utilizing and minimizing and/or maximizing for the updated subsurface model of a portion of the Earth until a convergence criterion is met.

23. The method according to claim 1 wherein, further to said step of providing, the method comprises utilising said updated model for sub-surface exploration.

24. The method according to claim 1, wherein said at least one physical parameter comprises pressure, particle velocity or displacement.

25. The method according to claim 1, wherein the observed data set and the predicted data set comprise values of a plurality of physical parameters.

26. The method according to claim 1, wherein said at least one convolutional filter is operable to render the cross-correlation of at least a portion of the observed seismic dataset with at least a portion of the predicted seismic dataset and the cross-correlation of at least a portion of the predicted seismic dataset with at least a portion of the observed seismic dataset approximations of one another.

27. A method of subsurface exploration, the method comprising generating a geophysical representation of a portion of the volume of the Earth from a seismic measurement of at least one physical parameter, and comprising the steps of:
providing an observed seismic data set comprising at least three distinct non-zero data values derived from at least three distinct non-zero seismic measured values of said portion of the volume of the Earth;
generating, using a subsurface model of a portion of the Earth comprising a plurality of model coefficients, a predicted seismic data set comprising at least three distinct non-zero data values;
utilizing one or more non-trivial convolutional filters, the one or more non-trivial convolutional filters comprising three or more non-zero filter coefficients and configured to, when convolved with the predicted seismic data set, maximize the similarity or minimize the mismatch between the convolved predicted data set and the observed data set;
minimizing and/or maximizing one or more objective functions operable to measure the similarity and/or mismatch between the filter coefficients for the one or more non-trivial convolutional filters and at least three reference coefficients for one or more reference filters by modifying at least one model coefficient of said subsurface model of a portion of the Earth to produce an updated subsurface model of a portion of the Earth; and
providing an updated subsurface model of a portion of the Earth for subsurface exploration.

28. The method according to claim 27, wherein said at least one non-trivial convolutional filter is operable to transform at least a portion of said predicted seismic data set to render the observed seismic data set and predicted data set approximations of one another.

29. The method according to claim 27, further comprising:
utilizing at least one further non-trivial convolutional filter, the at least one further non-trivial convolutional filter comprising three or more non-zero filter coefficients and configured to, when convolved with the observed seismic data set, maximize the similarity or minimize the mismatch between the convolved observed data set and the convolved predicted data set.

30. The method according to claim 29, wherein the or more non-trivial convolutional filters is operable to transform at least a portion of said predicted seismic data set and the at least one further non-trivial convolutional filter is operable to transform said observed data set to render the observed seismic data set and predicted data set approximations of one another.

31. A non-transitory computer usable storage medium having a computer program product executable by a programmed or programmable processing apparatus, comprising one or more software portions for performing a method of subsurface exploration, the method comprising generating a geophysical representation of a portion of the volume of the Earth from a seismic measurement of at least one physical parameter, and comprising the steps of:
providing an observed seismic data set comprising at least three distinct non-zero data values derived from at least three distinct non-zero seismic measured values of said portion of the volume of the Earth;

generating, using a subsurface model of a portion of the Earth comprising a plurality of model coefficients, a predicted seismic data set comprising at least three distinct non-zero data values;

utilizing one or more non-trivial convolutional filters, each convolutional filter comprising three or more non-zero filter coefficients and operable, when convolved with the observed seismic data set, to maximize the similarity or minimize the mismatch between the convolved observed data set and the predicted data set minimizing and/or maximizing one or more objective functions operable to measure the similarity and/or mismatch between the filter coefficients for the one or more non-trivial convolutional filters and at least three reference coefficients of one or more reference filters by modifying at least one model coefficient of said subsurface model of a portion of the Earth to produce an updated subsurface model of a portion of the Earth; and providing an updated subsurface model of a portion of the Earth for subsurface exploration.

32. A non-transitory computer usable storage medium having a computer program product executable by a programmed or programmable processing apparatus, comprising one or more software portions for performing a method of subsurface exploration, the method comprising generating a geophysical representation of a portion of the volume of the Earth from a seismic measurement of at least one physical parameter, and comprising the steps of:

providing an observed seismic data set comprising at least three distinct non-zero data values derived from at least three distinct non-zero seismic measured values of said portion of the volume of the Earth;

generating, using a subsurface model of a portion of the Earth comprising a plurality of model coefficients, a predicted seismic data set comprising at least three distinct non-zero data values;

utilizing one or more non-trivial convolutional filters, each convolutional filter comprising three or more non-zero filter coefficients and operable, when convolved with the predicted data set, to maximize the similarity or minimize the mismatch between the convolved predicted data set and the observed seismic data set;

minimizing and/or maximizing one or more objective functions operable to measure the similarity and/or mismatch between the filter coefficients for the one or more non-trivial convolutional filters and at least three reference coefficients of one or more reference filters by modifying at least one model coefficient of said subsurface model of a portion of the Earth to produce an updated subsurface model of a portion of the Earth; and providing an updated subsurface model of a portion of the Earth for subsurface exploration.

* * * * *